US011861043B1

(12) United States Patent
Poh et al.

(10) Patent No.: US 11,861,043 B1
(45) Date of Patent: *Jan. 2, 2024

(54) SYSTEMS AND PROCESSES FOR LOSSY BIOMETRIC REPRESENTATIONS

(71) Applicant: T Stamp Inc., Atlanta, GA (US)

(72) Inventors: Norman Hoon Thian Poh, Atlanta, GA (US); Gareth Neville Genner, Atlanta, GA (US)

(73) Assignee: T STAMP INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/702,361

(22) Filed: Mar. 23, 2022

Related U.S. Application Data

(63) Continuation of application No. 16/841,269, filed on Apr. 6, 2020, now Pat. No. 11,301,586.

(Continued)

(51) Int. Cl.
  *G06F 21/62* (2013.01)
  *H04L 9/08* (2006.01)
  (Continued)

(52) U.S. Cl.
  CPC ........ *G06F 21/6254* (2013.01); *H04L 9/0643* (2013.01); *H04L 9/0869* (2013.01); *H04L 9/3231* (2013.01)

(58) Field of Classification Search
  CPC ... H04L 9/0643; H04L 9/3231; H04L 9/0866; H04L 9/0869; H04L 9/3242; G06F 21/32;
  (Continued)

(56) References Cited

U.S. PATENT DOCUMENTS 5,991,408 A * 11/1999 Pearson ............... H04L 9/3231
  382/116
6,836,554 B1 * 12/2004 Bolle ..................... G07C 9/37
  902/4

(Continued)

FOREIGN PATENT DOCUMENTS

CN 103930921 A 7/2014
EP 3065366 A1 9/2016
(Continued)

OTHER PUBLICATIONS

Rathgeb et al., "Unlinkable Improved Multi-biometric Iris Fuzzy Vault", EURASIP Journal on Information Security, 2016, 2016:26.

(Continued)

*Primary Examiner* — Sharon S Lynch
(74) *Attorney, Agent, or Firm* — Morris, Manning & Martin, LLP; Daniel E. Sineway, Esq.

(57) ABSTRACT

Systems and processes for improved processing of biometric data may include a hash controller including a processor, a server, and a registry. The hash controller can receive biometric information, such as a biometric scan, and apply an EGH transformation to convert the biometric information into an irreversible, unlinkable, and revocable EgHash. The EGH transformation can include blending biometric information with non-biometric information and permuting the biometric representation for additional security. The permuted biometric representation can be projected based on a randomly generated matrix and the output permuted to obtain an EgHash. The resultant EgHash can be lossy such that the EGH transform causes an irreversible loss of biometric information between the original biometric information and the EgHash. The EgHash can be compared and retrieved at speed and scale by the processor to support (Continued)

operations including, but not limited to, verification, identification, and database deduplication.

20 Claims, 8 Drawing Sheets

Related U.S. Application Data

(60) Provisional application No. 62/829,825, filed on Apr. 5, 2019.

(51) Int. Cl.
*H04L 9/06* (2006.01)
*H04L 9/32* (2006.01)

(58) Field of Classification Search
CPC ......... G06F 21/6254; G06F 2221/2113; G06F 7/483; G06F 7/58; G06K 19/06037
See application file for complete search history.

(56) References Cited

U.S. PATENT DOCUMENTS

| | | | |
|---|---|---|---|
| 7,120,607 B2* | 10/2006 | Bolle | G06Q 20/401 902/4 |
| 7,178,025 B2* | 2/2007 | Scheidt | H04L 63/062 713/168 |
| 7,412,081 B2 | 8/2008 | Doi | |
| 7,773,784 B2* | 8/2010 | Boult | G06F 18/22 713/186 |
| 7,822,631 B1 | 10/2010 | Vander Mey et al. | |
| 7,961,915 B2* | 6/2011 | Davida | G06V 40/10 340/5.83 |
| 8,010,460 B2 | 8/2011 | Work et al. | |
| 8,249,314 B2* | 8/2012 | Bolle | H04L 9/3231 713/186 |
| 8,312,291 B2* | 11/2012 | Golic | G06V 40/172 713/172 |
| 8,316,086 B2 | 11/2012 | Ufford et al. | |
| 8,325,994 B2* | 12/2012 | Davida | G06F 21/32 340/5.83 |
| 8,384,515 B2* | 2/2013 | Rachlin | G06F 21/6245 340/5.82 |
| 8,457,367 B1 | 6/2013 | Sipe et al. | |
| 8,510,797 B2 | 8/2013 | Kasturi | |
| 8,542,879 B1 | 9/2013 | Nechyba et al. | |
| 8,675,926 B2 | 3/2014 | Zhang et al. | |
| 8,724,856 B1 | 5/2014 | King | |
| 8,965,066 B1* | 2/2015 | Derakhshani | G06F 21/32 382/209 |
| 9,070,088 B1 | 6/2015 | Baveja et al. | |
| 9,147,117 B1 | 9/2015 | Madhu et al. | |
| 9,173,101 B1 | 10/2015 | Angelov et al. | |
| 9,262,725 B2 | 2/2016 | Butte et al. | |
| 9,300,676 B2 | 3/2016 | Madhu et al. | |
| 9,477,828 B2 | 10/2016 | Irie | |
| 9,495,588 B2* | 11/2016 | Derakhshani | H04L 9/14 |
| 9,521,606 B1 | 12/2016 | Costa et al. | |
| 9,652,663 B2 | 5/2017 | Lau et al. | |
| 9,679,212 B2 | 6/2017 | Kim et al. | |
| 9,721,147 B1 | 8/2017 | Kapczynski | |
| 9,838,388 B2 | 12/2017 | Mather et al. | |
| 9,866,393 B1 | 1/2018 | Rush et al. | |
| 10,019,561 B1 | 7/2018 | Shelton et al. | |
| 10,049,287 B2 | 8/2018 | Holz et al. | |
| 10,210,388 B2* | 2/2019 | Derakhshani | G06V 40/193 |
| 10,225,255 B1 | 3/2019 | Jampani et al. | |
| 10,275,684 B2 | 4/2019 | Han et al. | |
| 10,320,569 B1* | 6/2019 | Wentz | H04L 9/3239 |
| 10,430,638 B2 | 10/2019 | Russo | |
| 10,594,688 B2* | 3/2020 | Yang | G09C 1/00 |
| 10,628,700 B2 | 4/2020 | Puri et al. | |
| 10,635,894 B1 | 4/2020 | Genner | |
| 10,650,226 B2 | 5/2020 | Chu et al. | |
| 10,733,424 B2 | 8/2020 | Son et al. | |
| 10,735,205 B1* | 8/2020 | Wentz | H04L 9/3257 |
| 10,796,178 B2 | 10/2020 | Fan et al. | |
| 10,810,423 B2 | 10/2020 | Thavalengal | |
| 10,936,708 B2* | 3/2021 | Aronowitz | G06F 16/2255 |
| 10,956,704 B2* | 3/2021 | Gottemukkula | G06N 3/08 |
| 11,080,516 B1 | 8/2021 | Joshi et al. | |
| 11,080,517 B2 | 8/2021 | Wu et al. | |
| 11,093,771 B1 | 8/2021 | Genner | |
| 11,095,631 B1 | 8/2021 | Genner | |
| 11,151,468 B1* | 10/2021 | Chen | G06N 7/01 |
| 2004/0019570 A1* | 1/2004 | Bolle | G06V 40/168 705/64 |
| 2004/0096085 A1 | 5/2004 | Matsumoto et al. | |
| 2004/0186906 A1 | 9/2004 | Torrant et al. | |
| 2005/0235148 A1* | 10/2005 | Scheidt | G06Q 20/3829 713/168 |
| 2006/0015358 A1 | 1/2006 | Chua | |
| 2006/0042483 A1 | 3/2006 | Work et al. | |
| 2006/0114520 A1 | 6/2006 | Enomoto et al. | |
| 2006/0212931 A1 | 9/2006 | Shull et al. | |
| 2007/0174633 A1 | 7/2007 | Draper et al. | |
| 2008/0310727 A1 | 12/2008 | Wu et al. | |
| 2008/0313714 A1 | 12/2008 | Fetterman et al. | |
| 2009/0022374 A1* | 1/2009 | Boult | G06F 18/22 382/119 |
| 2009/0080717 A1 | 3/2009 | Dias | |
| 2009/0210722 A1 | 8/2009 | Russo | |
| 2009/0271634 A1 | 10/2009 | Boult et al. | |
| 2009/0310830 A1* | 12/2009 | Bolle | H04L 9/0866 382/124 |
| 2009/0327054 A1 | 12/2009 | Yao et al. | |
| 2010/0017618 A1* | 1/2010 | Golic | H04L 9/3231 713/186 |
| 2010/0066493 A1* | 3/2010 | Rachlin | G06V 10/7715 340/5.82 |
| 2010/0194530 A1* | 8/2010 | Davida | G06F 21/32 340/5.82 |
| 2010/0194919 A1 | 8/2010 | Ishii et al. | |
| 2010/0250676 A1 | 9/2010 | Ufford et al. | |
| 2011/0099277 A1 | 4/2011 | Yao et al. | |
| 2011/0131643 A1 | 6/2011 | Lawrence et al. | |
| 2011/0137789 A1 | 6/2011 | Kortina et al. | |
| 2011/0246766 A1 | 10/2011 | Orsini et al. | |
| 2011/0285748 A1 | 11/2011 | Slatter et al. | |
| 2011/0302420 A1* | 12/2011 | Davida | G06V 40/10 713/180 |
| 2012/0011066 A1 | 1/2012 | Telle et al. | |
| 2012/0014507 A1 | 1/2012 | Wu et al. | |
| 2012/0072384 A1 | 3/2012 | Schreiner et al. | |
| 2012/0102332 A1 | 4/2012 | Mullin | |
| 2012/0124651 A1 | 5/2012 | Ganesan et al. | |
| 2012/0130863 A1 | 5/2012 | Tedjamulia et al. | |
| 2012/0284786 A1 | 11/2012 | Somani et al. | |
| 2012/0331567 A1 | 12/2012 | Shelton | |
| 2013/0004033 A1* | 1/2013 | Trugenberger | G06F 21/32 382/125 |
| 2013/0086641 A1 | 4/2013 | Mehr et al. | |
| 2013/0104202 A1 | 4/2013 | Yin et al. | |
| 2013/0124644 A1 | 5/2013 | Hunt et al. | |
| 2013/0191898 A1 | 7/2013 | Kraft | |
| 2013/0219479 A1 | 8/2013 | DeSoto et al. | |
| 2013/0259228 A1* | 10/2013 | Ren | H04L 9/3236 380/200 |
| 2013/0262873 A1 | 10/2013 | Read et al. | |
| 2014/0013422 A1 | 1/2014 | Janus et al. | |
| 2014/0020073 A1 | 1/2014 | Ronda et al. | |
| 2014/0037074 A1 | 2/2014 | Bravo et al. | |
| 2014/0037156 A1 | 2/2014 | Cavallini | |
| 2014/0059660 A1 | 2/2014 | Marra et al. | |
| 2014/0071131 A1 | 3/2014 | Kitago | |
| 2014/0075513 A1 | 3/2014 | Trammel et al. | |
| 2014/0090039 A1 | 3/2014 | Bhow | |
| 2014/0101434 A1 | 4/2014 | Senthurpandi et al. | |
| 2014/0129493 A1 | 5/2014 | Leopold | |
| 2014/0164218 A1 | 6/2014 | Stewart | |
| 2014/0230023 A1 | 8/2014 | Parks | |
| 2014/0247985 A1 | 9/2014 | Park | |

(56) References Cited

U.S. PATENT DOCUMENTS

| | | |
|---|---|---|
| 2014/0253707 A1 | 9/2014 | Gangadhar |
| 2014/0258305 A1 | 9/2014 | Kapadia et al. |
| 2014/0270404 A1 | 9/2014 | Hanna et al. |
| 2014/0273978 A1 | 9/2014 | Van Snellenberg |
| 2014/0279556 A1 | 9/2014 | Priebatsch et al. |
| 2014/0289833 A1 | 9/2014 | Briceno et al. |
| 2014/0330732 A1 | 11/2014 | Grignon |
| 2014/0333415 A1 | 11/2014 | Kursun |
| 2014/0337948 A1 | 11/2014 | Hoyos |
| 2015/0046327 A1 | 2/2015 | Taupitz |
| 2015/0059003 A1 | 2/2015 | Bouse |
| 2015/0078630 A1* | 3/2015 | Derakhshani ......... H04L 9/0822 382/117 |
| 2015/0121456 A1 | 4/2015 | Milman et al. |
| 2015/0154436 A1 | 6/2015 | Shi et al. |
| 2015/0156031 A1 | 6/2015 | Fadell et al. |
| 2015/0180857 A1 | 6/2015 | Schulman et al. |
| 2015/0186721 A1* | 7/2015 | Derakhshani ......... H04L 9/0822 382/117 |
| 2015/0205800 A1 | 7/2015 | Work et al. |
| 2015/0227890 A1 | 8/2015 | Bednarek et al. |
| 2015/0261999 A1 | 9/2015 | Thiebot et al. |
| 2015/0269394 A1 | 9/2015 | Bringer et al. |
| 2015/0332169 A1 | 11/2015 | Bivens et al. |
| 2016/0019614 A1 | 1/2016 | Dziuk |
| 2016/0034708 A1 | 2/2016 | Shim et al. |
| 2016/0037156 A1 | 2/2016 | Lee |
| 2016/0048837 A1 | 2/2016 | Jin et al. |
| 2016/0050199 A1 | 2/2016 | Ganesan |
| 2016/0070704 A1 | 3/2016 | Yu |
| 2016/0085958 A1 | 3/2016 | Kang |
| 2016/0088023 A1 | 3/2016 | Handa et al. |
| 2016/0132901 A1 | 5/2016 | Davar et al. |
| 2016/0173605 A1 | 6/2016 | Iasi et al. |
| 2016/0191513 A1 | 6/2016 | Tomlinson et al. |
| 2016/0224853 A1 | 8/2016 | Xiong |
| 2016/0269178 A1* | 9/2016 | Yang ................. H04L 63/0861 |
| 2016/0277424 A1 | 9/2016 | Mawji et al. |
| 2016/0379182 A1 | 12/2016 | Sheng et al. |
| 2017/0006008 A1 | 1/2017 | Moran et al. |
| 2017/0019400 A1 | 1/2017 | Drolshagen et al. |
| 2017/0032485 A1 | 2/2017 | Vemury |
| 2017/0034183 A1 | 2/2017 | Enqvist et al. |
| 2017/0061138 A1 | 3/2017 | Lambert |
| 2017/0082740 A1 | 3/2017 | Kitchens, II et al. |
| 2017/0134366 A1 | 5/2017 | Genner et al. |
| 2017/0140204 A1* | 5/2017 | Derakhshani ........... G06F 21/32 |
| 2017/0210525 A1 | 7/2017 | Mayer et al. |
| 2017/0250796 A1* | 8/2017 | Samid ................. H04L 9/0838 |
| 2017/0256056 A1 | 9/2017 | Jain et al. |
| 2017/0264599 A1 | 9/2017 | O'Regan et al. |
| 2017/0279795 A1 | 9/2017 | Redberg |
| 2017/0286788 A1 | 10/2017 | Fan et al. |
| 2017/0331818 A1 | 11/2017 | Kader et al. |
| 2017/0346851 A1* | 11/2017 | Drake ................. H04L 9/0838 |
| 2017/0372055 A1 | 12/2017 | Robinson et al. |
| 2018/0005019 A1 | 1/2018 | Chattopadhyay et al. |
| 2018/0018651 A1 | 1/2018 | Nelson et al. |
| 2018/0034852 A1 | 2/2018 | Goldenberg |
| 2018/0048472 A1 | 2/2018 | Pirrwitz et al. |
| 2018/0060648 A1 | 3/2018 | Yoo et al. |
| 2018/0069703 A1 | 3/2018 | Chakraborty et al. |
| 2018/0077571 A1 | 3/2018 | Mannopantar et al. |
| 2018/0082455 A1 | 3/2018 | Yamaji et al. |
| 2018/0097806 A1* | 4/2018 | Blinn ................. H04L 63/0861 |
| 2018/0101742 A1 | 4/2018 | Burge et al. |
| 2018/0167388 A1 | 6/2018 | Farrell et al. |
| 2018/0191501 A1 | 7/2018 | Lindemann |
| 2018/0205557 A1 | 7/2018 | Sun |
| 2018/0211092 A9* | 7/2018 | Derakhshani ......... H04L 9/0866 |
| 2018/0248699 A1 | 8/2018 | Andrade |
| 2018/0302406 A1 | 10/2018 | Burckhardt et al. |
| 2018/0307895 A1 | 10/2018 | Chu et al. |
| 2019/0043148 A1 | 2/2019 | Vemury |
| 2019/0311102 A1 | 10/2019 | Tussy |
| 2019/0312734 A1* | 10/2019 | Wentz ................. H04L 9/0877 |
| 2019/0334884 A1 | 10/2019 | Ross et al. |
| 2019/0379541 A1 | 12/2019 | Schwach et al. |
| 2020/0036707 A1 | 1/2020 | Callahan et al. |
| 2020/0084191 A1* | 3/2020 | Nicholls ............... H04L 9/0825 |
| 2020/0104472 A1* | 4/2020 | Aronowitz .......... G06F 16/2255 |
| 2020/0143137 A1* | 5/2020 | Gottemukkula ......... G06N 3/04 |
| 2020/0145219 A1 | 5/2020 | Sebastian et al. |
| 2020/0153624 A1* | 5/2020 | Wentz ..................... G06F 21/32 |
| 2020/0186350 A1* | 6/2020 | Wentz ..................... G06F 21/62 |
| 2020/0201679 A1* | 6/2020 | Wentz ................... G06F 9/5044 |
| 2020/0257889 A1 | 8/2020 | Merkel et al. |
| 2020/0293640 A1 | 9/2020 | Joshi et al. |
| 2020/0351089 A1* | 11/2020 | Wentz ................... H04L 9/3236 |
| 2020/0351098 A1* | 11/2020 | Wentz ................... H04L 9/3247 |
| 2020/0351657 A1* | 11/2020 | Wentz ................... H04L 9/3268 |
| 2020/0356085 A1* | 11/2020 | Wentz ................... H04L 9/0866 |
| 2020/0404019 A1* | 12/2020 | Drake ................... H04L 9/3226 |
| 2021/0019519 A1 | 1/2021 | Martin et al. |
| 2021/0027080 A1 | 1/2021 | Storm et al. |
| 2021/0073518 A1 | 3/2021 | Kumar et al. |
| 2022/0157077 A1* | 5/2022 | Gupta ................ G06V 40/1312 |

FOREIGN PATENT DOCUMENTS

| | | |
|---|---|---|
| WO | 2008010773 A1 | 1/2008 |
| WO | 2019034589 A1 | 2/2019 |

OTHER PUBLICATIONS

Wonjun Kim, Face Liveness Detection From a Single Image via Diffusion Speed Model, IEEE Transactions on Image Processing, vol. 24, No. 8, Apr. 13, 2015, pp. 2456 to 2465.

Xinting Gao, Single-View Recaptured Image Detection Based on Physics-Based Features, 2010 IEEE International Conference on Multimedia and Expo, Jul. 19, 2010, pp. 1469 to 1474.

Di Wen, Face Spoof Detection with Image Distortion Analysis, IEEE Transactions on Information Forensics and Security, vol. 10, No. 4, Apr. 2015, pp. 746 to 761.

Rohit Kumar Pandey, Deep Secure Encoding for Face Template Protection, Conference on Computer Vision and Pattern Recognition Workshops, Jun. 26, 2016, pp. 77 to 83.

* cited by examiner

SYSTEMS AND PROCESSES FOR LOSSY BIOMETRIC REPRESENTATIONS

CROSS REFERENCE TO RELATED APPLICATIONS

This application is a continuation of U.S. application Ser. No. 16/841,269, filed Apr. 6, 2020, entitled "SYSTEMS AND PROCESSES FOR LOSSY BIOMETRIC REPRESENTATIONS," which, claims the benefit of and priority to U.S. patent application Ser. No. 62/829,825, filed Apr. 5, 2019, entitled "THE EVERGREEN HASH," the disclosures of which are incorporated herein by reference as if set forth in their entireties.

TECHNICAL FIELD

The present technology relates generally to processing biometric data in a secured domain, also known as biometric template protection (BTP).

BACKGROUND

Although biometrics can be used to uniquely identify an individual, biometric templates used therein can also be a vulnerable point of attack because original biometric templates cannot be reissued or replaced unlike security tokens or passwords. Previous approaches to securing biometric templates typically utilized techniques to obfuscate original templates and create secondary templates, derived therefrom, to increase the technical barriers to reconstructing the irreplaceable original biometric templates.

For example, previous solutions typically apply lossless transformation techniques to original biometric templates to create secondary templates. The previous solutions utilize lossless transformation techniques, because the techniques result in zero loss of information between the original templates and the secondary templates derived therefrom. However, because the secondary template contains all information from the original template (albeit in different format), it is still technically feasible for an attacker to reverse the transformation and reconstruct the original template.

Moreover, to obfuscate the original biometric information, some lossless transform techniques inject noise or distort the original biometric information which consequently result in loss in accuracy. As described above, the lossless transformation techniques that also inject noise increases security at the expense of reduced accuracy. However, this noise-injection approach is not entirely secure because all the original biometric information is still preserved.

Therefore, there is a long-felt, but unresolved need for a system or process that can transform size-variant, personally-identifying biometric templates into fixed-size, privacy-secured representations, while maintaining sufficiently accurate biometric matching capabilities.

BRIEF SUMMARY OF THE DISCLOSURE

Aspects of the present disclosure relate generally to systems and methods for protecting biometric data whilst still being able to support biometric operations.

According to one aspect of the present disclosure, an original biometric representation (e.g., a collection of data points or a fixed-size vector derived from a person's face) may be transformed via the presently-disclosed EGH transform in either a reversible or irreversible manner. In various embodiments, when the transform is lossy, even if a potential attacker possessed the transformed biometric template, the original template cannot be reconstructed with 100% fidelity.

According to one embodiment, the present biometric template protection (BTP) systems and processes provide for irreversible biometric representations because the EgHashes described herein cannot be reconstructed into an original biometric representation. In at least one embodiment, the present BTP systems and processes provide biometric representation revocability because stored EgHashes may be cancelled (e.g., invalidated) and renewed by re-enrolling subjects (or from securely stored original biometric representations). In one or more embodiments, the systems and processes provide for unlinkability and diversity in biometric representations because multiple EgHashes for the same individual, but generated for disparate applications, may appear very different from each other and thus, if one EgHash is stolen, the stolen EgHash will not be linked to the individual in other applications. In various embodiments, the systems and methods provide for compact representation of biometric information because an EgHash is compacted by a factor of up to 10 compared to the source original biometric representation. According to one embodiment, the system and processes provide improved biometric matching performance because multiple EgHashes may be used to attain recognition accuracy greater than or equal to accuracy demonstrated by a native matcher using original biometric representations (e.g., which are more vulnerable to the theft than the present EgHashes).

In one embodiment, a biometric template may be generated, or encoded, from an image of a person's face. According to various aspects of the present disclosure, characteristics of the person's face may be identified via techniques such as convolutional neural networks, and those characteristics may be encoded and included in the fixed-size vector (or similar data object). In a particular embodiment, the fixed-size representation and a key may be concatenated along with the fixed-size vector, and further transformed via a seed-generated hashing algorithm. According to one embodiment, the key is a vector of randomly generated numbers generated by a pseudo number generator controlled by a seed. In various embodiments, a seed used for generating the key and a seed used for generating transform parameters may be the same or two different seeds. According to various aspects of the present disclosure, the fixed-size vector may be smaller in size than the size of the original biometric representation (e.g., 128 bytes) and the key (e.g., 64 bytes) combined (e.g., 192 bytes), and thus, the EGH transform is lossy (only 128 bytes). In various embodiments, the resultant EgHash is described as cancellable or revocable even if the seed or the transform parameters are stolen or compromised. In some embodiments, the present systems and methods may execute lossless hash transforms (e.g., for backup purposes). In one example of a lossless transformation, an original biometric representation is 128 bytes, a key is 64 bytes and, thus, the output EgHash is fixed to 192 bytes, thereby retaining all of the input information. In one or more embodiments that are based on lossless transform, an EgHash is described as cancellable or revocable only if a seed or transform parameters are not stolen or compromised. According to certain embodiments, other sizes of elements such as the original biometric representations, keys, and combined results are possible and contemplated according to aspects of the present disclosure.

In various embodiments, the EGH transform leverages pseudonymization and anonymization operations (as recommended by the European Union's General Protection Regulation (GDPR)). In one or more embodiments, the EGH transform includes permuting biometric representations and EgHashes to further enhance the security of EgHash in terms of unlinkability or diversity. In various embodiments, two EgHashes of the subject, which are transformed by EGH using two different seeds, are said to be unlinkable because the EgHashes are substantially different from each other in terms of Euclidean distance and similar distance metrics. In one embodiment, an extent of their difference is referred to as "diversity."

In particular embodiments, the systems and processes discussed herein are supported by at least an EGH controller and a trusted and/or semi-trusted processor. In one embodiment, the EGH controller may be software, hardware, or a hardware/software combination, where the EGH controller may control or own EgHashes, generate transform parameters given a seed, transform the EgHashes, reverse transform EgHashes, and allow for operations such as enrollment, database deduplication, identification, and verification. In certain embodiments, a trusted or semi-trusted EGH processor may also be software, hardware, or a hardware/software combination, and the processor may process EgHashes, transform the previous EgHashes in an EGH chain or original biometric scans and representations into new EgHashes but may not reverse transform, and may also perform operations including database deduplication, identification, and verification.

According to one aspect of the present disclosure, a process for transforming biometric data including: A) receiving a biometric representation of a subject; B) concatenating the biometric representation with a key to generate a concatenated biometric representation; C) projecting the concatenated biometric representation based on one or more transformation parameters to generate an anonymized vector representation; and D) storing the projected anonymized vector representation in a hash registry.

According to a further aspect, the process for transforming biometric data, wherein a dimension of the anonymized vector representation is less than a dimension of the concatenated biometric representation.

According to a further aspect, the process for transforming biometric data, wherein a vector dimension of the anonymized vector representation is equal to a vector dimension of the concatenated biometric representation.

According to as further aspect, the process for transforming biometric data, wherein the key is a unique key received from a user.

According to a further aspect, the process for transforming biometric data, wherein the key is a common key associated with a particular organization and is received with the biometric representation.

According to a further aspect, the process for transforming biometric data, further including: A) generating a random seed; and B) generating the key and the set of transformation parameters based on the random seed.

According to a further aspect, the process for transforming biometric data, further including: A) prior to the projecting, permuting the concatenated biometric representation with the biometric representation and the key to generate a permuted, combined representation, wherein the projecting is performed using the permuted, combined representation; and B) prior to the storing, permuting the anonymized vector representation to generate a permuted vector representation, wherein the permuted anonymized vector representation is stored in the hash registry.

According to a further aspect, the process for transforming biometric data, further including: A) receiving a second biometric representation associated with the subject; B) generating a second projected anonymized vector representation based on the second biometric representation; C) performing a 1:1 comparison between the stored anonymized vector representation and the second anonymized vector representation to generate a similarity score; D) determining that the similarity score satisfies a similarity threshold; and E) in response to determining the similarity score satisfies the similarity threshold, confirming a positive verification of the subject's identity.

According to a further aspect, the process for transforming biometric data, further including: A) receiving a second biometric representation associated with the subject; B) generating a second projected anonymized vector representation based on the second biometric representation; C) performing a 1:N comparison between the second projected anonymized vector representation and a plurality of projected anonymized vector representations stored in the hash registry to generate a plurality of similarity scores; D) determining that a particular similarity score of the plurality of similarity scores satisfies a similarity threshold; and E) in response to determining the similarity score satisfies the similarity threshold, confirming a positive identification of the subject.

According to one aspect of the present disclosure, a system for biometric identification, including: A) a hash controller; and B) at least one hash processor in operative communication with the hash controller, wherein the at least one hash processor is configured to: 1) populate a particular hash registry with anonymized vector representations from a controller hash registry associated with the hash controller; 2) receive a biometric representation, the biometric representation being associated with a particular subject; 3) generate a anonymized vector representation from the biometric representation, wherein the generating includes applying a lossy transformation to the biometric representation; 4) perform a 1:N comparison between the generated anonymized vector representation and the anonymized vector representations in the populated particular hash registry to generate a set of similarity scores; 5) identify a particular score of the set of similarity scores; 6) determine that the particular score satisfies a similarity threshold; and 7) upon determining that the particular score satisfies the similarity threshold, confirm a positive identification of the subject.

According to a further aspect, the system for biometric identification, wherein confirming the positive identification of the subject further includes providing the subject with one or more privileges based on a policy list associated with the subject.

According to a further aspect, the system for biometric identification, wherein the one or more privileges include providing the user access to a physical environment.

According to a further aspect, the system for biometric identification, wherein the one or more privileges include providing the user access to a computing environment.

According to a further aspect, the system for biometric identification, wherein confirming the positive identification includes transmitting a notification to the user.

According to a further aspect, the system for biometric identification, wherein: A) the at least one hash processor is a trusted hash processor or a semi-trusted hash processor; and B) the particular hash registry is a trusted hash registry or a semi-trusted hash registry.

According to a further aspect, the system for biometric identification, wherein the particular score is a top-ranked score.

According to one aspect of the present disclosure, a system for biometric verification including a hash controller and at least one hash processor, wherein the at least one hash processor is configured to: A) populate a particular hash registry with anonymized vector representations from a controller hash registry associated with the hash controller; B) receive a biometric representation and a unique key from a user, the biometric representation being associated with a particular subject; C) generate a anonymized vector representation, wherein the generating includes applying a lossy transformation to the biometric representation; D) retrieve a stored anonymized vector representation associated with the unique key from the populated particular hash registry; E) perform a 1:1 comparison between the projected anonymized vector representation and the stored anonymized vector representation to generate a similarity score; F) determine that the similarity score satisfies a similarity threshold; and G) upon determining that the similarity score satisfies the similarity threshold, confirm a positive verification of the subject's identity.

According to a further aspect, the system for biometric identification, wherein: A) the at least one hash processor is further configured to provide the subject one or more privileges upon transmitting the notification; and B) the one or more privileges are determined based on a policy list associated with the subject.

According to a further aspect, the system for biometric identification, wherein the one or more privileges include providing the user access to a physical environment.

According to a further aspect, the system for biometric identification of claim 18, wherein the one or more privileges include providing the user access to a computing environment.

According to a further aspect, the system for biometric identification, wherein the projected anonymized vector representation includes an EgHash and the stored anonymized vector representation includes a second EgHash.

These and other aspects, features, and benefits of the claimed systems and processes will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
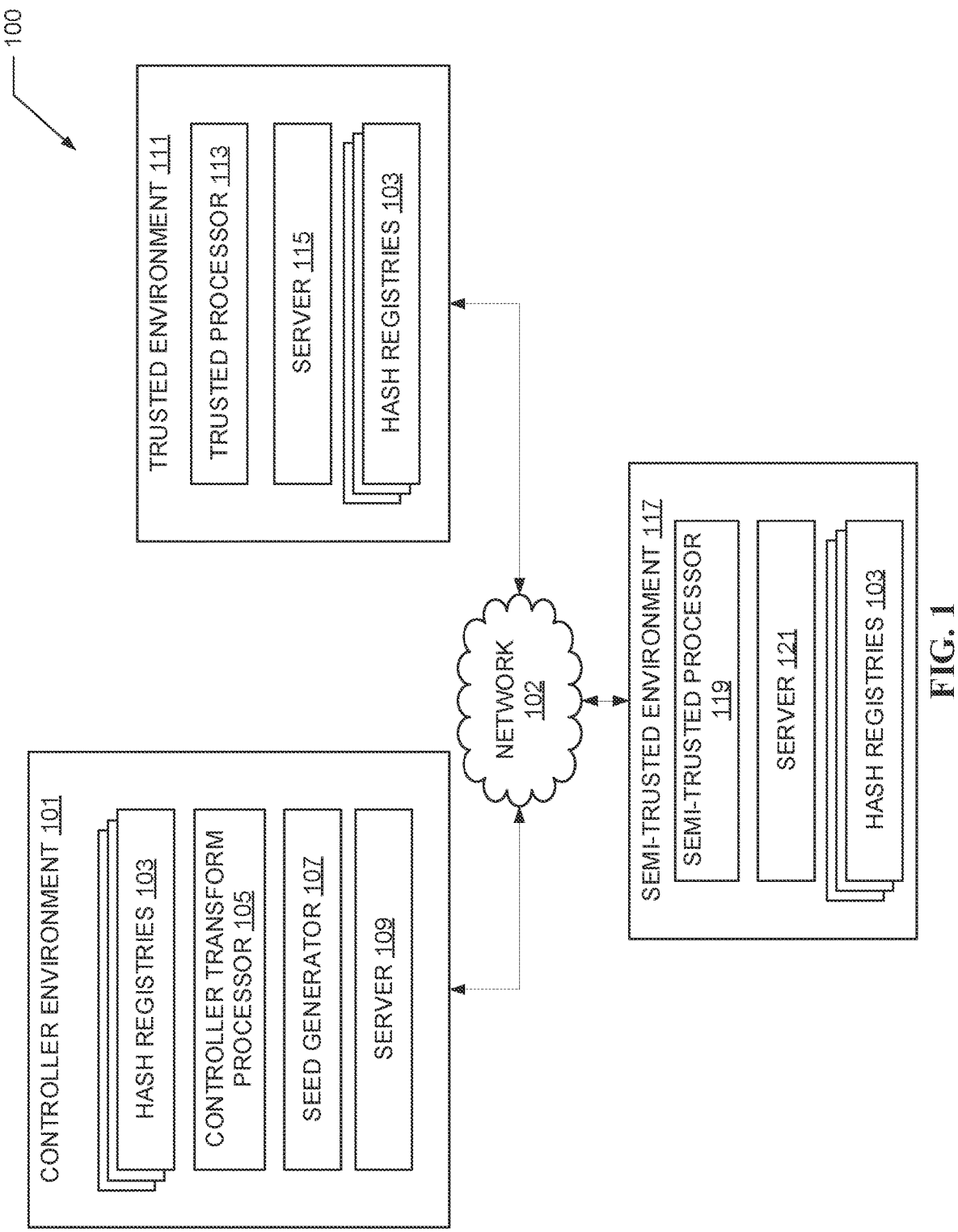
FIG. 1 shows an overview of an exemplary EGH transform system, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

As used herein "original biometric representation" generally refers to encoded features obtained by a biometric feature extraction module after processing a biometric sample. In various examples, an original biometric representation is a collection of data points or a fixed-size vector derived from a biometric scan of a person's face, palm, iris, finger, and other body parts, as well as multi-modal combinations of body parts (e.g., such as a combination of data point collections for four fingers). Biometric scans including, but not limited to, palm, finger, facial, and multi-modal scans may be algorithmically processed and encoded into the original biometric representations described herein, and the original biometric representations may be transformed via an Evergreen Hash Transform (EGH) into secure, anonymized vector representations (referred to, in some embodiments, as "EgHashes." According to one embodiment, the transformed representations described herein function as pseudonymous identifiers according to the ISO/IEC 24745 standard on biometric information protection.

As used herein "Evergreen Hash (EGH) transform" generally refers to a particular transformation function for transforming biometric representations into secure, cancellable, irreversible biometric representations. In various embodiments, the EGH transform is a type of biometric template protection (BTP) scheme that may be a cancellable biometrics system, for example, as described in the ISO/IEC 24745 standard on biometric information protection (incorporated by reference herein). According to one embodiment, the EGH transform is an anonymization function (e.g., as opposed to a pseudonymization function). It will be understood by one of ordinary skill in the art that the systems and processes described herein are not limited to biometrics, but may be used in other applications as will become apparent.

As used herein "EgHash" generally refers to an output of an EGH transform. According to one embodiment, an EgHash is a vector serving as an anonymized vector representation of a subject's biometric data. In some embodiments, the EgHash functions as a pseudonymous identifier (PI) according to the ISO/IEC 24645 standard, incorporated by reference herein. In some embodiments, the anonymized vector representation may be used in pseudonymous verification and identification processes while providing enhanced security due to the anonymization processes used in the representation production.

As used herein "biodata" generally refers to a data representing a subject's anatomical features (e.g., such as a biometric representation described herein) and "non-biodata" generally refers to a key (and, in some embodiments, other information, such as metadata). In various embodiments, an EGH transform blends biodata and non-biodata to generate an EgHash. In at least one embodiment, relative dimensions of the biodata and non-biodata are proportional to the level of security provided by the EGH transform. In one example, if biodata (e.g., a facial biometric representation) includes 128 floating point numbers, non-biodata (e.g., a key) is selected to include 128 floating point numbers.

As used herein "auxiliary data" generally refers to a portion of data received upon enrolling a subject or person (e.g., receiving and transforming an original biometric scan or representation). In various embodiments, auxiliary data is used to generate an anonymized vector representation of biometric data (e.g., a biometric scan or representation). According to one embodiment, auxiliary data is used to generate a pseudonymous identifier (PI) (e.g., according to the ISO/IEC 24645 standard) in the form of an EgHash. In at least one embodiment, auxiliary data includes, but is not limited to, a key, a seed, or one or more EGH transformation parameters. In various embodiments, a "seed" is a random number used to initialize a random number generator that generates the transformation parameters and a key (e.g., non-biodata). According to one embodiment, the seed may be derived from a password or pin, and may be encrypted and stored, for example, as a digital token or QR code. In at least one embodiment, a key and EGH transformation parameters are transparent (e.g., viewable) to a developer using the present systems and processes. In one or more embodiments, auxiliary data, or at least a key and EGH transformation parameters thereof, are stored in a configuration file accessible by a developer.

Overview

Aspects of the present disclosure relate generally to systems and methods for encryption via performing one-way transforms over biometric data.

To protect biometric data against theft and misuse, cryptographic methods such as encryption and hashing often cannot be used directly because biometric features contain real-valued data points which are fuzzy. As a result, to secure biometric data, several BTP schemes exist. Unfortunately, in making a biometric template more secure, previous BTP schemes can degrade the recognition performance, which is the case for transformation-based BTP schemes. Previous approaches are based on homomorphic encryption; however, the output representations of such approaches are not easily revocable, for example, in instances where the representation is compromised by an attacker. Moreover, the homomorphic encryption schemes are computationally expensive and scale poorly for biometric identification (which involves one-to-many comparisons). As a result, previous approaches not suitable for use in high-throughput biometric identification operations for example, due to lack of compactness, revocability, and irreversibility, amongst other drawbacks.

According to one embodiment, the EGH process includes transforming an original biometric scan into a compact, anonymized vector representation, referred to herein generally as an "EgHash", that can be indexed and compared in an expedient manner (i.e., in logarithmic time) to support one-to-many (1:N) matching, including identification, watch-list, and database deduplication operations. In various embodiments, the transformation operations are classified as anonymization; and as such the resultant output is non-personally identifying information (PII) that confirms to General Protection Regulation (GDPR) and other similar privacy governance requirements. In one or more embodiments, even though the transformation is irreversible and cancellable, the output EgHash still retains its original purposes as an effective (but secure) biometric representation. In at least one embodiment, by using multiple EgHashes, each only a fraction of the original size by reason of lossy compression, followed by score-level fusion, biometric matching accuracy is maintained at levels comparable to (and, in some embodiments, in excess of) biometric matching accuracy achieved with original biometric scans.

According to one embodiment, EgHashes are irreversible and cannot be reconstructed to their original form. In one or more embodiments, the basis for its irreversibility is warranted by the principle of lossy data compression (also known as irreversible compression) used to generate the EgHashes. In various embodiments, the lossy approach uses inexact approximations and partial data discarding to represent the biometric information derived from a biometric scan.

In various embodiments, EgHashes are revocable and, thus, can be discarded at any time. For example, if a breach of EgHashes for an organization is suspected, the organization-level EgHashes can be cancelled and replacement EgHashes can be reissued by re-enrolling the organization's subjects or from securely and remotely stored original biometric templates or lossless EgHashes. In one or more embodiments, EgHashes support 1:1 and 1:N deduplication operations, and matching algorithms enable 1:N identification/deduplication to be performed efficiently (e.g., in logarithmic time). According to one embodiment, EgHashes demonstrate significantly smaller template size compared to original biometric representations, for example, because the EGH transformation results in dimension reduction of the biometric representation. In at least one embodiment, EgHashes maintain high discrimination power for biometric matching processes while providing increased security over previous BTP and other biometric approaches.

In one example, the EGH transform takes an input vector which is a biometric representation of b floating-point numbers. The biometric representation is then padded with another vector (referred to as non-biodata, a key, or nonce) that is randomly generated based on a random seed in order to increase the overall dimension to b+n numbers. The dimension of the padding vector, n, is defined in relation to the original input vector, e.g., by a factor such as 2 (e.g., so two times longer), 1 (same size), ½ (half the size), ¼, ⅛, and etc. The higher n is, the more "noise" is added. In certain embodiments, the random seed is generated from a secret (a "key" that can be selected by the enterprise deploying the EGH technology) using industry-standard hashing algorithms, such as, for example, SHA256, SHA384, and SHA512 as defined in FIPS 180-2, as well as RSA's MD5 algorithm. The concatenated vector is then subject to a matrix projection (multiplication), given as output x numbers, and, in some embodiments, permutation to create a projected representation referred to as an EgHash. The output dimension of the projected representation, x, is defined in relation to the dimension of the input vector, by a factor of at most 1 (to ensure information loss), but can be smaller, ½, ⅓, ¼, ⅛. The smaller x is, the more drastic the reduction is biometric representation size. Because $x<b+n$, it follows that the information is irreversibly lost, meaning that any attempt to perfectly reconstruct the original vector is futile. Furthermore, the inequality $x<b+n$ demonstrates two important strategies to increase security including increasing the dimension of the non-biodata (key), n, and reducing the final output, x, (e.g., the final EgHash size). In various embodiments, while the former strategy increases the amount of noise injected into the final EgHash, the latter strategy determines the amount of information that is deliberately lost necessary to ensure irreversibility.

According to one embodiment, for each biometric modality, different dimensions of x and n are chosen to maintain accuracy whilst guaranteeing irreversibility and reducing the biometric representation size. In one or more embodiments, a data set is used to empirically estimate the actual accuracy obtained for a given configuration of x and n before the configuration is used in the EGH process. In at least one embodiment, lossy data compression and its irreversibility are underpinned by rate-distortion theory, which is a branch of information theory. In various embodiments, the theory remains the same despite potential differences in the objective of the theory's typical application, (e.g., to retain as much useful information as possible in the data compression case) versus an objective to retain only biometrically-relevant information. In various embodiments, the EGH transform includes additional transformative steps described herein for further increasing the security of output EgHashes.

In various embodiments, in addition to primary authentication data and a "header" with optional and limited unencrypted data, the EgHashes discussed herein can store any secondary authentication data (such as Know Your Customer (KYC), Anti-Money Laundering (AML) and other data) and can embed "pivot points" to external data. In one or more embodiments, the storage architecture for the primary authentication fields may be fixed to ensure compatibility and search-ability within and (potentially) across institutions, and additional fields may be unique to each institution with specific permissions attributed.

According to various aspects of the present disclosure, each EgHash represents a "digital-DNA" that may include a global and lifelong authentication for an individual, regardless of the evolution or proliferation of authentication techniques. In particular embodiments, not just the additional data stored, but also the methodology used for biometric authentication can be changed over time while preserving architecture of processors and registries used for producing, processing, and storing the EgHashes, thereby guarding against system and data redundancy. In other words, aspects of the present disclosure allow for generation and implementation of EgHashes in new and evolving techniques in a seamless, fast, and inexpensive manner because the EgHashes and associated architecture are agnostic to the biometric matching solution into which they are integrated.

In various embodiments, the hashing or transformation-based BTP techniques discussed herein may be server and/or blockchain-based, and may allow for institutions to implement multiple and evolving authentication techniques into a standard record that can serve users based on the market, risk level, and circumstances. For example, various identification cards/resources such as drivers licenses, state ID cards, federal ID's, etc., may be accepted by various institutions based on predetermined standards at those institutions, and these forms of identification can be used for generating or verifying bio-hashes. In some embodiments, an institution may only accept EgHashes generated by its own systems, or it may enter into mutual recognition agreements and/or data sharing with other institutions with acceptable standards, whether for fraud detection, customer mobility or interoperability.

In one example of the present system, a banking institution implements a biometric matching service for verifying customer (e.g., subject) identity to provide access to detailed account information and other PII. In previous approaches, the banking institution may use unencrypted and/or untransformed representations of biometric scans to verify user identity; however such approaches leave the banking institution and customers vulnerable to attack because the biometric information, if stolen, may be readily used to illicitly access the secure information. In the same example, with aspects of the present system, the banking institution may transmit original biometric scans or representations to a hash controller that applies the EGH transform to generate lossy EgHashes that are irreversible and remain uniquely associated with the corresponding subjects. Continuing with the same example, a banking customer uses a user account in the banking institution's application to provide a biometric facial scan that is transmitted (along with a unique key associated with the customer) to a trusted hash processor. The trusted hash processor: 1) generates an EgHash based on the biometric facial scan and the unique key; 2) identifies a stored EgHash associated with the customer based on the unique key; 3) and performs a 1:1 comparison to compute a similarity metric between the generated and stored EgHashes. In the same example, the trusted hash processor determines that the computed similarity score satisfies a predetermined similarity threshold and, in response, transmits a notification to the banking application that the customer's identity is verified. Based on the notification of positive verification, the customer is granted access to the portions of the banking application containing the PII.

In the same example, an attacker obtains the EgHash of the customer. In previous approaches a theft of a biometric template may constitute an irrecoverable loss of PII and leave the victim permanently vulnerable to subsequent attacks, such as identity theft. In contrast, because the EgHash of the customer is non-PII, the banking institution simply cancels the EgHash and re-enrolls the customer into the system by generating a new EgHash and, thus, the PII of the customer and the integrity of the system are not compromised.

Exemplary Embodiments

Referring now to the figures, for the purposes of example and explanation of the fundamental processes and components of the disclosed systems and methods, reference is made to FIG. 1, which illustrates an exemplary, high-level overview of one embodiment of the present system 100. As will be understood and appreciated, the exemplary system 100 shown in FIG. 1 represents merely one approach or embodiment of the present system, and other aspects are used according to various embodiments of the present system.

According to one embodiment, the system 100 includes a controller environment 101, a trusted environment 111, and a semi-trusted environment 117. In one or more embodiments, each environment is configured to perform only certain actions (e.g., based on policies, capabilities, and data provided to each environment). In one or more embodiments, the controller environment 101, trusted environment 111, and semi-trusted environment 117 each include one or more hash registries 103 configured to store EgHashes. In various embodiments, the one or more hash registries 103 include a plurality of secure databases configured to store transformed biometric representations in the form of reversible or irreversible EgHashes. According to one embodiment, the trusted environment 111 and semi-trusted environment 117 include only lossy-transform hash registries 103 that are synched with lossy-transform registries 103 of the trusted environment 101.

In one or more embodiments, each of the hash registries 103 is associated with a specific application. In one example, the controller environment 101 includes first hash registry 103 associated with a first biometric matching application and a second hash registry 103 associated with a second biometric matching application. In the same example, the first and second hash registries 103 may include the same subjects; however, EgHashes corresponding to the same subject are unrelated between the registries and, thus, if an attacker compromised the first hash registry 103, the attacker would not be able to utilize the EgHashes therein to access services of the second biometric matching application.

In one or more embodiments, the controller environment 101 is configured to perform functions including, but not limited to: 1) enrollment of subjects into the system 100 via processing of biometric information and generation and transformation of biometric representations into lossy or lossless EgHashes; 2) verification of subject identity based on comparisons between a probe EgHash and associated EgHashes stored in the controller environment 101; 3) identification of subject identity based on comparisons between a probe EgHash and EgHashes stored in the controller environment 101; 4) database deduplication; and 5) reverse transformation of EgHashes into source biometric representations.

In one or more embodiments, the controller environment 101 includes a controller processor 105 configured to transform biometric representations into EgHashes by performing EGH transforms as described herein. In at least one embodiment, the controller processor 105 generates transformation parameters (e.g., for use in EGH transformation) based on a seed generated by a seed generator 107. According to one embodiment, the controller processor 105 is configured to perform both forward transforms (to obtain EgHashes) and reverse transformations (to obtain source biometric representations) in either a lossy or lossless manner. In one or more embodiments, the transform processor 105 performs lossless transformations on original biometric representations (e.g., from a biometric or hash registry) such that only a transformed version of the biometric representations are stored in the system 100. In at least one embodiment, the controller processor 105 performs EGH transformation on a hash registry 103 of unmodified biometric representations to generate a new hash registry 103 of EgHashes for use by a specific application.

In various embodiments, the trusted environment 111 is configured to perform actions including, but not limited to: 1) processing biometric information including EgHashes and original biometric scans and representations; 2) receiving EgHashes and transformation parameters (e.g., excluding a seed used to determine the parameters) from the controller environment 101; 3) verification of subject identity; 4) determining subject identity; 5) database deduplication; and 6) performing forward, lossy EGH transforms to generate EgHashes from biometric representations based on received transformation parameters. In at least one embodiment, the trusted environment 111 is configured to be incapable of performing particular functions including, but not limited to, storing historical copies of hash registries 103 and performing reverse transformations on EgHashes. According to one embodiment, the semi-trusted environment 117 includes a semi-trusted processor configured to perform lossy EGH transformation based on auxiliary data generated from a seed generator 107.

In at least one embodiment, the semi-trusted environment 117 is configured to perform actions including, but not limited to: 1) processing biometric information including EgHashes and original biometric scans and representations; 2) receiving EgHashes and transformation parameters (e.g., excluding a seed used to determine the parameters) from the controller environment 101; 3) verification of subject identity; 4) determining subject identity; 5) performing forward, lossy EGH transforms to generate EgHashes from biometric representations based on received transformation parameters; and 6) database deduplication. In various embodiments, the semi-trusted environment 117 is configured to be incapable of reversing EGH transformations, storing historical copies of hash registries 103. In at least one embodiment, the semi-trusted environment 117 is configured to use encrypted transformation parameters from the controller environment 101. According to one embodiment, the semi-trusted environment 117 includes a semi-trusted processor configured to perform lossy EGH transformation based on auxiliary data generated from a seed generator 107.

In various embodiments, the controller environment 101 includes a server 109 configured to communicate via a network 102 with a server 115 of the trusted environment 111 and a server 121 of the semi-trusted environment 117. In at least one embodiment, the server 109, server 115, and server 121 are operative to receive biometric scans and other information from sources including biometric scanners, electronic communication devices (such as smartphones), and software applications configured for secure communication via the network 102. In one example, the server 109 receives and transmits hash registries 103 and metadata (such as identifiers) from and to the trusted environment 111 or semi-trusted environment 117.

The network 102 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks. According to one embodiment, the network 102 is representative of a plurality of networks that are each associated with a specific trusted environment 111 or semi-trusted processor 117.

In at least one embodiment, the one or more hash registries 103 include one more secure databases that store transformed biometric representations as reversible (lossless) or irreversible (lossy) EgHashes.

Figure 2:
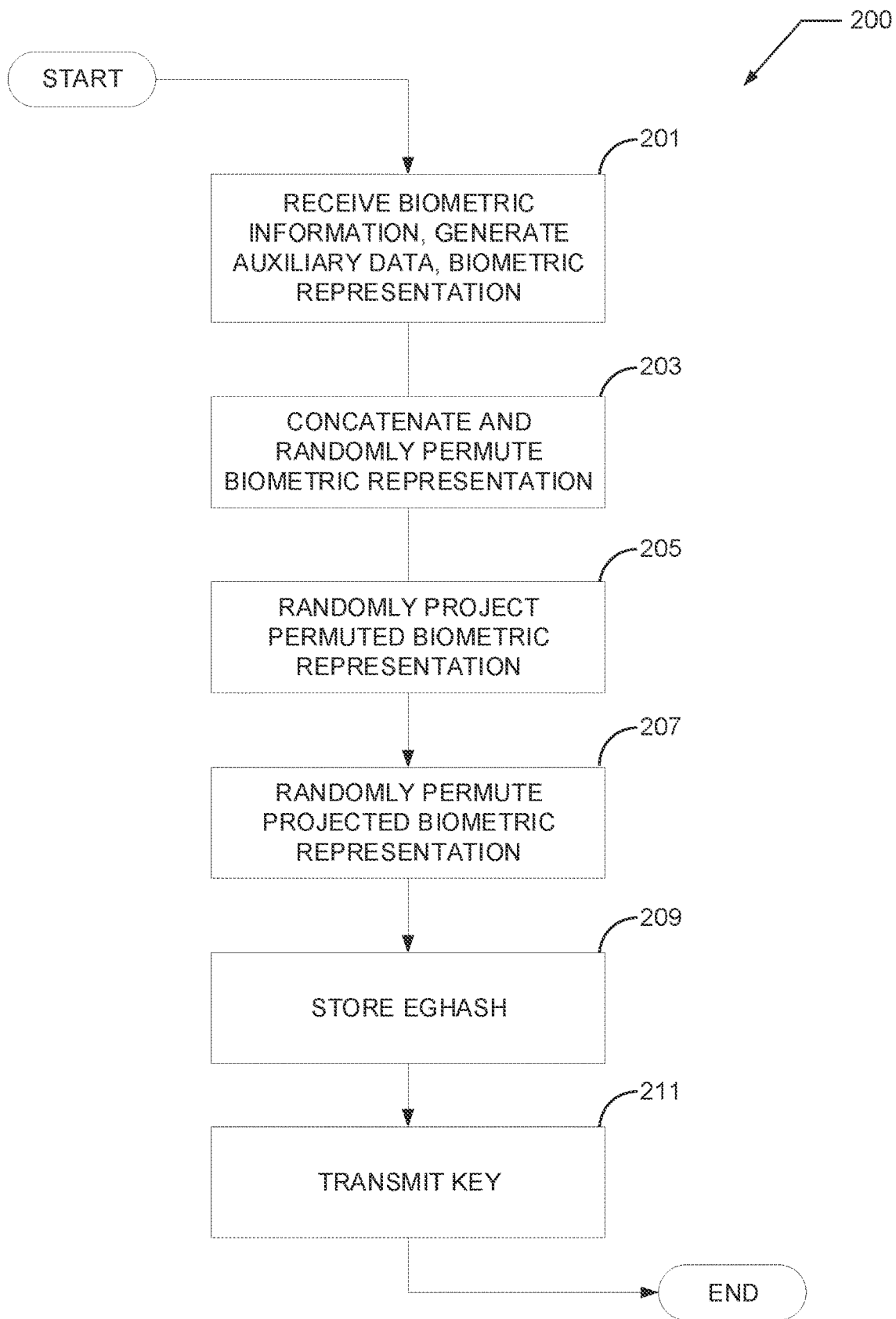
FIG. 2 shows an exemplary EGH transform process, according to one embodiment of the present disclosure.

As will be understood by one having ordinary skill in the art, the steps and processes shown in FIG. 2 (and those of all other flowcharts and sequence diagrams shown and described herein) may operate concurrently and continuously, are generally asynchronous and independent, and are not necessarily performed in the order shown.

FIG. 2 shows an enrollment process 200 for receiving biometric information, such as a facial scan, generating a biometric representation of the information, and transforming the biometric representation into an anonymized vector representation (e.g., an EgHash). In one or more embodiments, the process 200 is configured to transform the biometric representation into a pseudonymous vector representation.

At step 201, biometric information is received. The biometric information can include a scan of a subject, such as a facial scan, palm scan, multi-modal finger scan, or other body portion, or a biometric representation previously generated from a scan of a subject. According to one embodiment, an identifier is associated (and, in some instances, concatenated) with the biometric information for the purposes of tracking the information throughout the process 200 and organizing a resultant EgHash.

In one or more embodiments, the system 100 may perform actions to confirm that a biometric scan represents a live individual and not, for example, a scanned static image of an individual (that is, one form of presentation attack). In at least one embodiments, proof of liveness (technically known as presentation attack detection) is determined as described in U.S. patent application Ser. No. 15/782,940, filed Oct. 13, 2017, entitled "SYSTEMS AND METHODS FOR PASSIVE-SUBJECT LIVENESS VERIFICATION IN DIGITAL MEDIA," which is incorporated herein by reference as if set forth in its entirety.

At step 201, a seed generator 107 randomly generates a seed value that is associated with one application. According to one embodiment, the seed value is used to generate auxiliary data including a key and one or more transformation parameters used to perform the EGH transform.

At step 201, biometric information is received. The biometric information can include a biometric scan or a biometric representation encoded from the biometric scan. In some embodiments, the system 100 receives and encodes a biometric scan into a biometric representation. In at least one embodiment, the encoding is performed by a deep convolutional neural network acting as an encoder. In various embodiments, transformation parameters used for encoding a scan result in the application of one or more modifications (e.g., such as scales, shifts, and/or or rotations) being applied to the scan prior to its encoding into a vectorized biometric representation. In some embodiments, the steps of encoding are not performed, for example, when a biometric representation of a biometric scan is received. In at least one embodiment, the transformation parameters include scale and shift modifications that are applied to a received or system-generated biometric representation. In one or more embodiments, the modification of a biometric scan or representation increases the security of the system 100 to attacks because the number and complexity of steps required to reverse the resultant EgHashes are increased.

At step 203, the biometric representation, as biodata, is concatenated with the generated key, as non-biodata. In at least one embodiment, the concatenated bio- and non-bio representation is randomly permuted (e.g., based on the random seed or a second generated random seed from another source). As used herein, permutation generally refers to a random rearranging of values in the concatenated representation. In one or more embodiments, the key vector is stored in a hash registry 103 and a copy of the key vector is provided to the subject being enrolled into the system 100. In one embodiment, the key vector is provided by the subject in future biometric verification or identification processes to uniquely associate the subject with a corresponding EgHash or set of EgHashes (e.g., such as a set of EgHashes for a particular organization). In another embodiment, a common key vector is provided by the system so that each subject does not need to carry keys that are unique to them.

At step 205, in one or more embodiments, a projected biometric representation is generated by randomly projecting the permuted biometric representation using matrix multiplication based on a randomly generated matrix. As used herein, random projection generally refers to techniques for reducing dimensionality of a set of points in a Euclidean space, for example, as described by the Johnson-Lindenstrauss Lemma for embedding high dimensional spaces into low dimensional spaces such that average distances between points in the spaces remain similar between the higher and lower dimensions. According to one embodiment, the projection process is performed such the dimension of the projected biometric representation is equal to the dimension of the permuted representation, thereby resulting in lossless transformation. In alternate embodiments, the projection process is performed such that the dimension of the projected biometric representation is less than the dimension of the permuted representation, thereby resulting in lossy transformation because some amount of biometric-related information is lost permanently. According to one embodiment, EgHashes produced using lossy transformation are irreversible and, thus, are very robust to reconstruction attacks where an attacker attempts to reverse a transformation to reconstruct an original biometric representation or scan. In one example, an attacker possessing the full knowledge of the transformation algorithm, the transformation parameters, and/or the seed which the former depend—collectively known as auxiliary data—is still unable to reconstruct the original biometric scan or representation from an EgHash with 100% fidelity due to the irreversible loss of biometric information that occurred when generating the EgHash.

At step 207, the projected biometric representation is randomly permuted to produce an EgHash (a final transformed version of the biometric representation). At step 207, in at least one embodiment, the process 200 includes checking a hash registry 103 to determine if a duplicate of the EgHash is stored therein. According to one embodiment, the process 200 only proceeds to step 209 upon determining that there are no duplicates of the EgHash.

At step 209, the EgHash is stored in one or more hash registries 103 based on the key and/or a specific application for which the original biometric scan was obtained. For example, if the original biometric scan is associated with a healthcare group, the EgHash may be stored in a hash registry 103 of EgHashes processed by (or on behalf of) the healthcare group. In at least one embodiment, if a common key was used to generate the EgHash, the common key is stored in the hash registry 103 (or another database in the controller environment 101). In one or more embodiments, during implementation of the present EGH systems and processes, a user or institution (e.g., in control of the biometric application) may use a common key or a set of unique keys for the EGH transform process. In one example, a set of unique keys is used when subjects of the institution can carry a physical token, such as a QR code, or a digital token stored on a storage device for storing a unique key and/or a seed value associated with the subject.

At step 211, in various embodiments, a key is generated and associated with the EgHash, and the key is transmitted to the subject (or application) that provided the original biometric scan. In one or more embodiments, the key is used to authenticate subsequent EgHashes for the subject and to retrieve the stored EgHash for verification, identification, deduplication, and other purposes.

According to one embodiment, the EgHash is further transformed according to the process 200 using a common key of a specific application to generate an application-specific EgHash. In some embodiments, the original EgHash is stored in a hash registry 103 in the controller environment 101 as a backup for restoration purposes, and the secondary EgHash is transmitted to a trusted environment 111 or a semi-trusted environment 117 for storage in a hash registry 103 thereof. In various embodiments, an EgHash generated via lossless transformation is stored in a back-up hash registry 103 in the controller environment 101. According to one embodiment, the back-up hash registry 103 eliminates the need for a trusted environment 111 or semi-trusted environment to store an original, plaintext version of biometric representations. Consequently, according to this embodiment, the system 100 does not store any original, plaintext version of biometric representations.

In one or more embodiments, in common key schemes, biometric scans of all subjects for a particular application are transformed using the same common key designated for the particular application. In various embodiments, the common key is provided in subsequent identification, verification, and other processes to identify the stored EgHashes of a particular application. In one example, a subject is associated with multiple EgHashes for multiple applications, each application having its own common key for generating EgHashes thereof. In the same example, the EgHashes are dissimilar between applications (e.g., even though they are representative of the same subject) and, thus, if an EgHash for one application is compromised, the compromised EgHash is not usable in other applications.

In various embodiments, the original EgHash (or any derivative EgHash thereof) is transformed using a unique key provided by the subject associated therewith. In one example, when a biometric scan of a subject is obtained, the subject provides a unique key that is not stored in the system 100. According to one embodiment, the unique key is carried by the subject in a digital format, such as a QR code or other digital form for authentication. In one or more embodiments, the unique key serves as a second factor in a two-factor authentication, a first factor being the subject's biometric scan.

In various embodiments, as discussed herein, an EgHash may be further transformed any number of times in multiple layers in succession (e.g., analogous to encrypting a secret message multiple times) for added security. In one or more embodiments, EGH transform chains include an initial lossy transformation (to prevent original reconstruction) followed by any number of additional forward transformations. According to one embodiment, reverse transformation of each link in an EGH transform chain requires the use of the same auxiliary data (e.g., seed, key, and parameters) utilized in the previously performed forward transformation. In various embodiments, without the auxiliary data, reverse transformation would require computationally expensive brute force or hill-climbing techniques.

In one example, an original biometric representation of 128 bytes (e.g., 128 dimensions) is generated for a user and transformed in a lossy manner with a unique 64 byte user key to a user EgHash of 192 bytes. In the same example, the user EgHash is transformed in a lossy or lossless manner with a common 8-byte application key to an application EgHash of 200 bytes. Continuing the same example, the application EgHash is transformed in a lossy or lossless manner with a common 8 byte organization key to an organization EgHash of 208 bytes. In the same example, the final organization EgHash cannot be recovered to the user EgHash without first recovering the application EgHash. Because recovery to each iteration of the EgHash requires use of the same seed (e.g., and transformation parameters derived therefrom) used to generate the corresponding EgHash, any attempts to reverse transform any version of the EgHash by brute force or hill-climbing is computationally expensive and thus the EgHashes are substantially secure to reconstruction attacks. In the same example, even if an attacker obtains a seed and reverse transforms a subsequent iteration of the original EgHash, the compromised seed would be useless in further reverse transforming because each transform occurs with a different seed. Also in the same example, because the initial transformation was lossy, the original biometric representation or scan cannot be reconstructed.

In various embodiments, because EgHashes may be useful only for an intended application (e.g., as a result of application-specific transform parameters), cross-application or cross-site attacks are not permitted. In one example, an attacker who illegitimately obtains a transformed EgHash for a first application and inserts the EgHash into a second application will find that the inserted EgHash fails to match the victim's identity because of the different seed (e.g., and thus different key and transformation parameters) used in generating the EgHashes. In the same example, even if the attacker is able to obtain the key used for forward and reverse transformation of the EgHash, the recovered EgHash or biometric representation will still have less than 100% fidelity due to the irreversible loss of information that occurred in lossy transformation of the EgHash (or biometric representation).

Figure 3:
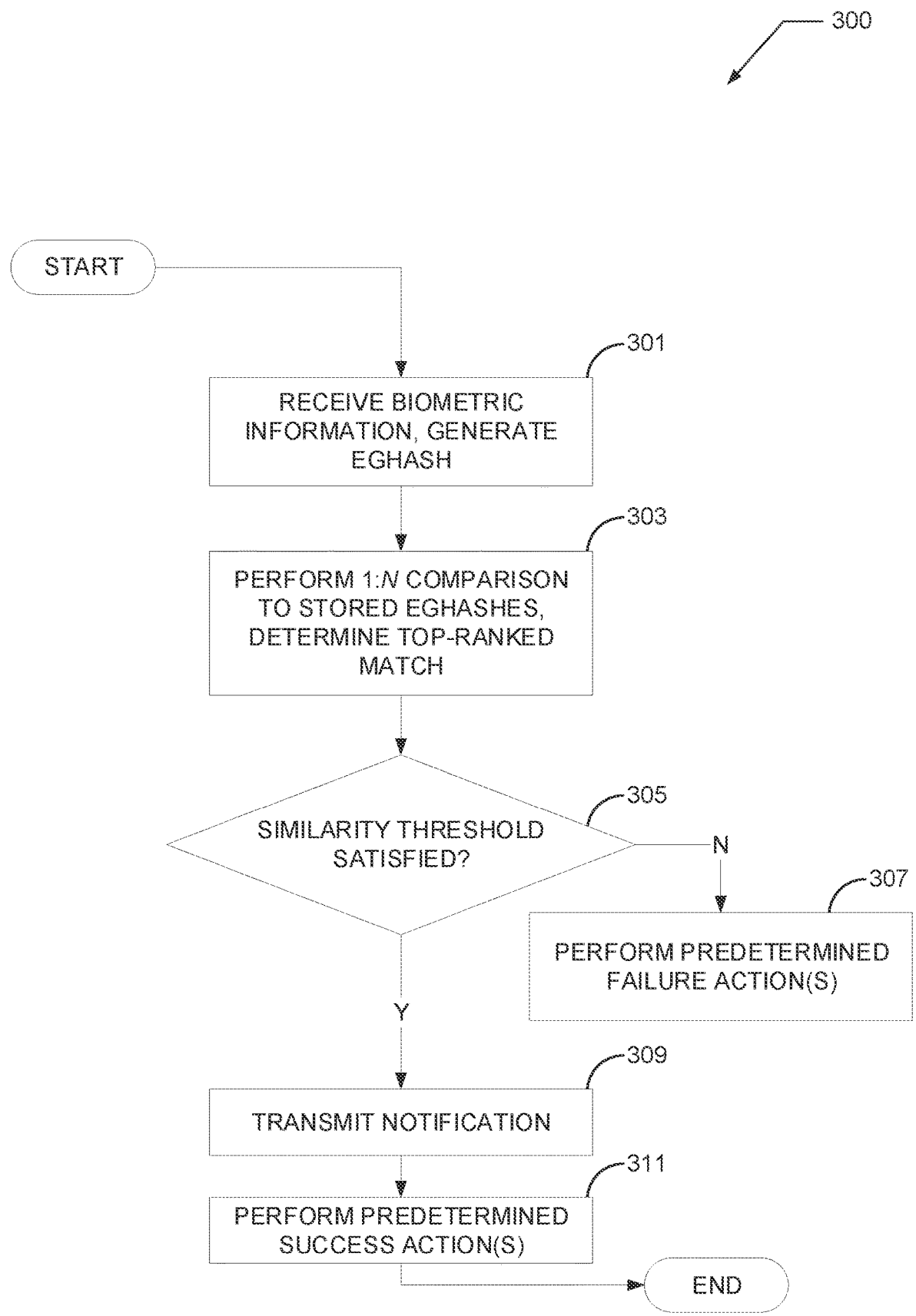
FIG. 3 shows an exemplary identification process, according to one embodiment of the present disclosure.

FIG. 3 shows a subject identification process 300 for receiving biometric information, transforming a biometric representation generated therefrom into a secure EgHash, and identifying a subject based on comparing the EgHash to a plurality of stored EgHashes.

At step 301, biometric information is received from an application operative for data communication with the system 100. In one example, the system 100 receives a facial scan from a biometric scanner. According to one embodiment, the biometric information is received at a trusted processor 113 or semi-trusted processor 119 configured to transform the biometric representation into an EgHash, before the representation is discarded or purged from the server memory. In various embodiments, the trusted processor 113 or semi-trusted processor 119 receives auxiliary data from a controller environment 101 and transforms the biometric information into an EgHash, for example, by performing the process 200 (e.g., however, the resultant output is not used to enroll the associated subject). In one or more embodiments, the trusted processor 113 or semi-trusted processor 119 includes a trusted or semi-trusted hash registry 103 that is synched with a control hash registry 103 of the controller environment 101. In at least one embodiment, the synchronizing populates the trusted or semi-trusted hash registry with stored EgHashes associated with an operator of the trusted processor 113 or semi-trusted processor 119. In one example, an operator of a trusted processor 113 is a banking institution and, thus, a trusted hash registry 103 is synched with a control registry 103 to provide copies of EgHashes of subjects associated with the banking institution and enrolled in the system 100.

At step 303, a 1:N comparison process is performed between the generated probe EgHash and the EgHashes stored in the synched hash registry 103 (e.g., N representing the quantity of synched EgHashes). In one or more embodiments, the 1:N comparison process includes calculating an $L^2$ norm metric, Euclidean distance, or other distance metric between the generated EgHash and each of the synched EgHashes. In various embodiments, an output of the 1:N comparison process is a set of similarity scores describing the similarity between the generated EgHash and each of the synched EgHashes. According to one embodiment, a top-ranked similarity score of the set of similarity scores is identified.

At step 305, the top-ranked similarity score is evaluated to determine if it satisfies a predetermined similarity threshold. In at least one embodiment, the threshold is determined by statistical techniques. In various embodiments, the threshold value lies between the expected value of the similarity score under mated-pair (same-subject) comparisons as the upper bound and the expected value of the similarity score under non-mated-pair (different-subject) comparisons as the lower bound. According to one embodiment, since the range of feasible threshold values give different false match (acceptance) and false non-match (rejection) rates, the exact value is determined empirically, e.g., the threshold at false acceptance rates (FAR) at 0.1%, 1% and 5% are typically used. According to one embodiment, the similarity threshold is a programmable benchmark that, if met, may result in the system 100 determining an identification match and, if not met, may result in the system 100 determining no match. In various embodiments, the similarity threshold is used to reduce a likelihood of false positive identification (e.g., disparate subjects being identified as the same subject) whilst maximizing the true positive identification (i.e., the probe subject is indeed in the gallery). In one or more embodiments, upon determining that the top-ranked similarity score does not satisfy the similarity threshold, the process 300 proceeds to step 307. In at least one embodiment, upon determining that the top-ranked similarity score satisfies the similarity threshold, the process 300 proceeds to step 309.

At step 307, one or more predetermined failure actions are taken in response to the failure to satisfy the similarity threshold. In various embodiments, the one or more predetermined failure actions include, but are not limited to, sending an alert, ceasing one or more processes associated with the subject (e.g., such as processes occurring in a specific application), logging the failed identification, and other actions. In one example, an alert is transmitted to the user (e.g., to a device or biometric scanning system associated therewith) indicating the identification failure. In another example, the system 100 causes a user display to render a message indicating that the scanned subject's identity cannot be determined. In one or more embodiments, the EgHash of the probe subject is stored in a hash registry 103 configured for storing EgHashes in which identification processes failed to determine a match.

At step 309, a notification is transmitted to the user confirming the identification of the scanned subject. In one example, the notification confirms that the subject is affiliated with a particular organization in control of the biometric scanner. In various embodiments, the positive identification of the subject is recorded in a database used, for example, to document the providing of privileges to positively identified subjects.

At step 311, one or more predetermined success actions are taken in response to the satisfaction of the similarity threshold. In various embodiments, the one or more predetermine success actions include, but are not limited to, providing one or more privileges based on the positive identification, transmitting an alert, automatically activating one or more processes, logging the successful identification, and other actions. In one or more embodiments, the one or more privileges include, but are not limited to, access to a physical environment, access to a computing environment, processing of a transaction, and other privileges. In one example, upon satisfaction of the similarity threshold, the system 100 automatically transmits a signal to a computing environment, in response, causes a locking mechanism to disengage. In at least one embodiment, a stored privilege policy list is stored in the system 100 and includes identifiers for enrolled subjects of the organization as well as privileges provided to each subject. According to one embodiment, the one or more privileges provided to the subject are determined based on the privileges stored in the privilege policy list and associated with the subject. In one example, the privilege policy list is used to provide varying levels of access to subjects of an organization based on factors such as rank, seniority, experience, and other factors.

As would be understood by one of ordinary skill in the art, the process 300 can be performed in a modified manner such that subjects in which the similarity threshold is not map (e.g., identification fails) are provided privileges, while subjects in which the similarity threshold is met are refused privileges.

Figure 4:
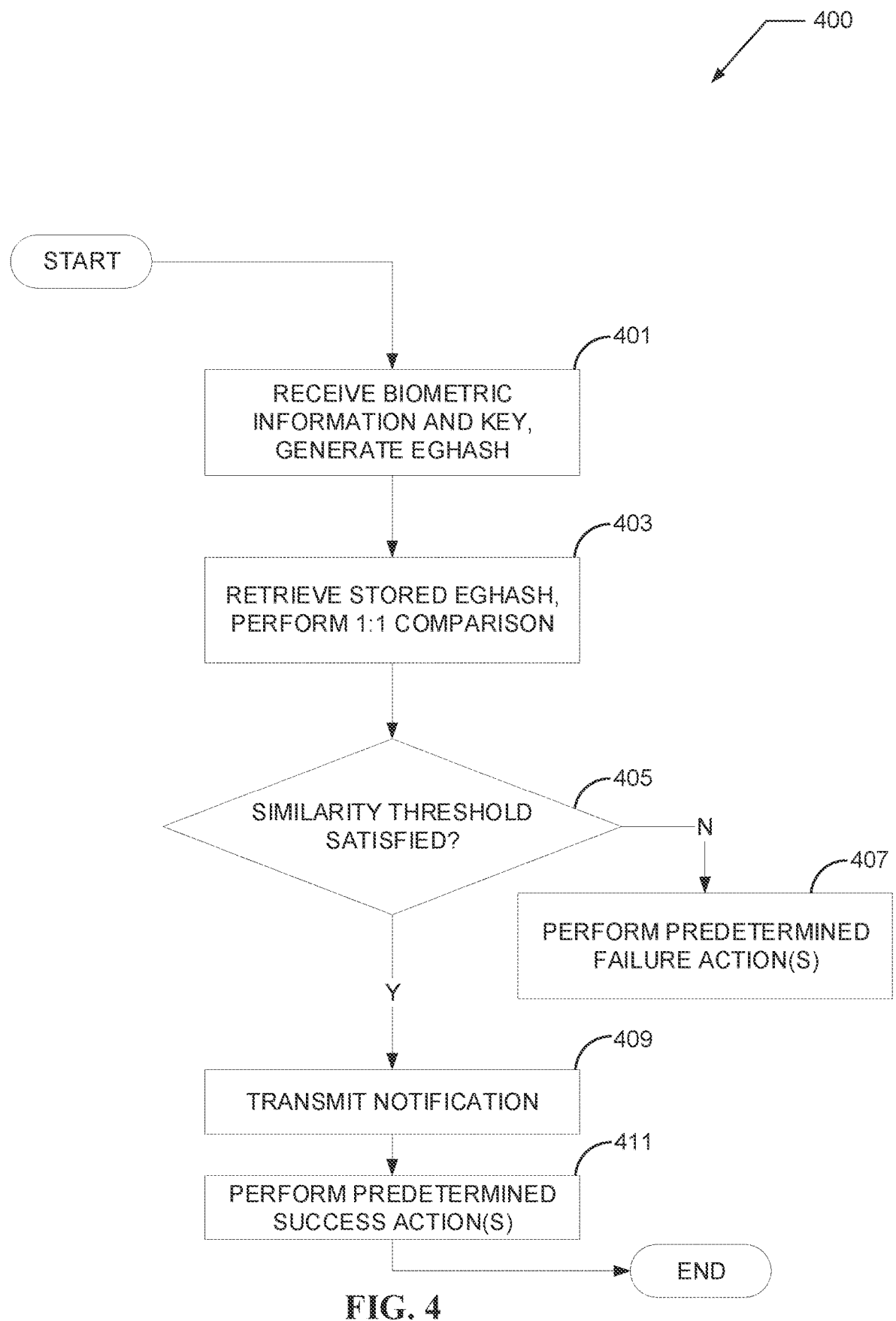
FIG. 4 shows an exemplary verification process, according to one embodiment of the present disclosure.

FIG. 4 shows a subject verification process 400 for receiving biometric information, transforming a biometric representation generated therefrom into a secure EgHash, and verifying the identity of the subject based on comparing the EgHash to a stored EgHash.

At step 401, biometric information is received from an application operative for data communication with the system 100. In one example, the system 100 receives a subject's facial scan and a unique user key from an electronic device controlled by the subject. According to one embodiment, the biometric information is received at a trusted processor 113 or semi-trusted processor 119 configured to transform the biometric information into an EgHash. In various embodiments, the trusted processor 113 or semi-trusted processor 119 receives auxiliary data from a controller environment 101 and transforms the biometric information into an EgHash, for example, by performing the process 200 (e.g., however, the resultant output is not used to enroll the associated subject). In one or more embodiments, the trusted processor 113 or semi-trusted processor includes hash registries 103 that are synched with controller hash registries 103 as described herein.

At step 403, a stored EgHash is retrieved from a synched hash registry 103 based on the unique user key. In some embodiments, a unique user key is used to retrieve multiple EgHashes, each EgHash being associated with the same subject. As used herein, a BTP strategy of using multiple EgHashes for the same subject is referred to as "multi-template" BTP and may improve biometric matching performance.

At step 403, the trusted processor 113 or semi-trusted processor 119 performs a 1:1 comparison between the generated EgHash and the retrieved EgHash. In one or more embodiments, the 1:1 comparison process includes calculating an $L^2$ norm metric, Euclidean distance, or other distance metric between the generated EgHash and the retrieved EgHash. In various embodiments, an output of the 1:1 comparison process is a similarity scores describing the similarity between the generated EgHash and the retrieved EgHash.

At step 405, the similarity score is evaluated to determine if it satisfies a predetermined similarity threshold. According to one embodiment, the similarity threshold is a programmable benchmark that, if met, may result in the system 100 verifying the subject's identity and, if not met, may result in the system 100 determining no verification or no match. In one or more embodiments, upon determining that the similarity score does not satisfy the similarity threshold, the process 400 proceeds to step 407. In at least one embodiment, upon determining that the top-ranked similarity score satisfies the similarity threshold, the process 400 proceeds to step 409.

At step 407, one or more predetermined failure actions are taken in response to the failure to satisfy the similarity threshold. In various embodiments, the one or more predetermined failure actions include, but are not limited to, sending an alert, ceasing one or more processes associated with the subject (e.g., such as processes occurring in a specific application), logging the failed verification, and other actions. In one example, an alert is transmitted to the user (e.g., to a device or biometric scanning system associated therewith) indicating the identity verification failure. In another example, the system 100 causes a user display to render a message indicating that the scanned subject's identity cannot be verified. In one or more embodiments, the generated EgHash of the subject is stored in a hash registry 103 configured for storing EgHashes in which identity verification processes failed.

At step 409, a notification is transmitted to the user confirming the verification of the subject's identity. In one example, the notification confirms that the subject is affiliated with a particular organization in control of the biometric scanner. In various embodiments, the positive identification of the subject is recorded in a database used, for example, to document the providing of privileges to identity-verified subjects.

At step 411, one or more predetermined success actions are taken in response to the satisfaction of the similarity threshold. In various embodiments, the one or more predetermine success actions include, but are not limited to, providing one or more privileges based on the positive verification, transmitting an alert, automatically activating one or more processes, logging the successful identification, and other actions. In one or more embodiments, the one or more privileges include, but are not limited to, access to a physical environment, access to a computing environment, processing of a transaction, and other privileges. In one example, upon satisfaction of the similarity threshold, the system 100 automatically transmits a signal to a computing environment, in response, causes a locking mechanism to disengage. In at least one embodiment, a stored privilege policy list is stored in the system 100 and includes identifiers for enrolled subjects of the organization as well as privileges provided to each subject. According to one embodiment, the one or more privileges provided to the subject are determined based on the privileges stored in the privilege policy list and associated with the subject. In one example, the privilege policy list is used to provide varying levels of access to subjects of an organization based on factors such as rank, seniority, experience, and other factors.

FIGS. 5-8 show results of one or more experimental tests performed using one or more embodiments of the present BTP systems and processes. The descriptions therein are provided for the purposes of illustrating various elements of the BTP systems and processes (e.g., as observed in the one or more embodiments). All descriptions, embodiments, and the like are exemplary in nature and place no limitations on any embodiment described, or anticipated, herein. The descriptions, embodiments, and the like are not intended to be dispositive of all data and results.

Figure 5:
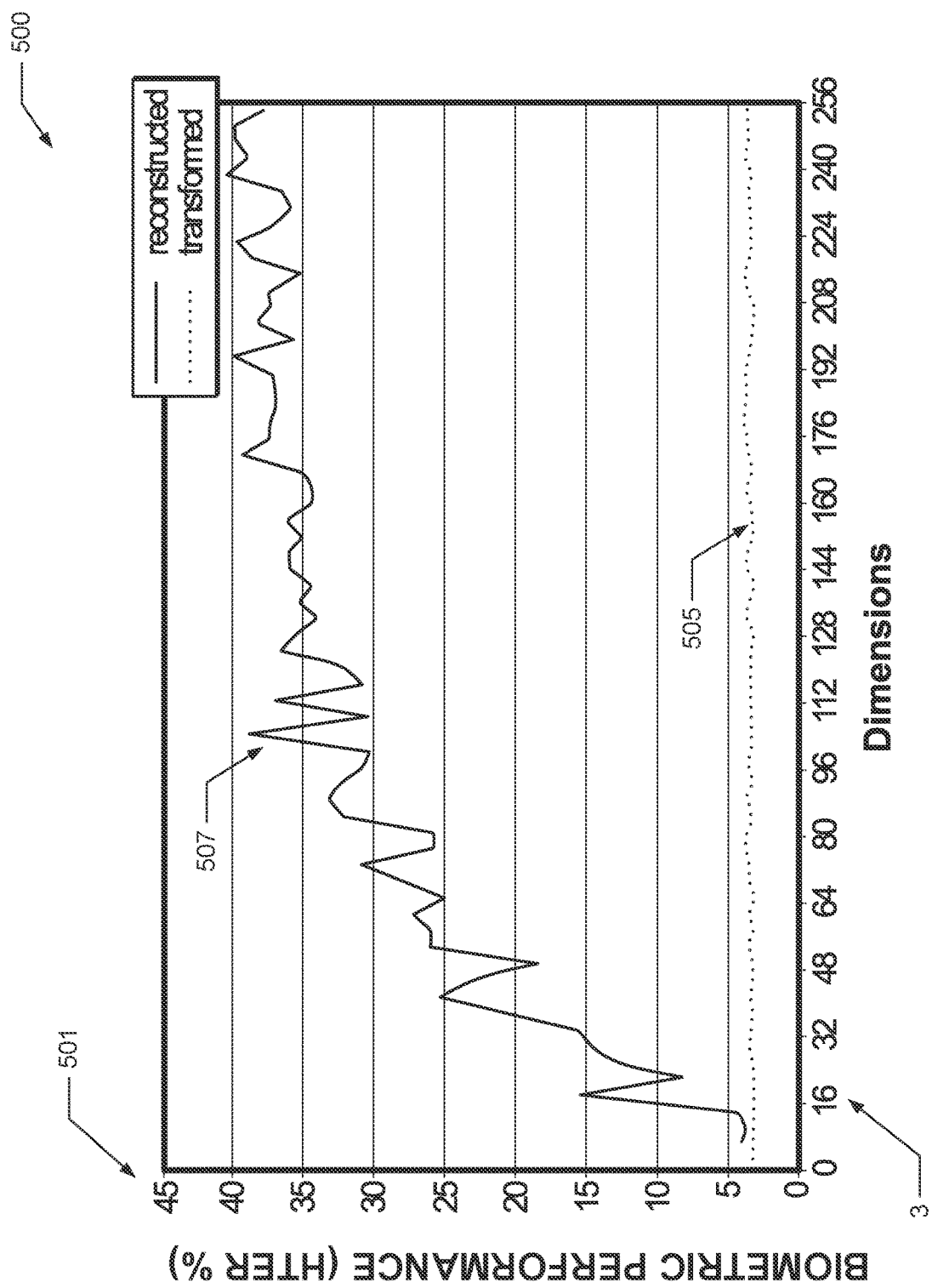
FIG. 5 shows a chart describing the biometric matching performance operating under two conditions as the dimension size of the non-biodata key used in generating EgHashes varies, according to one embodiment of the present disclosure.

FIG. 5 shows a chart 500 relating biometric matching performance 501 (expressed as a half total error rate (HTER) %) to EgHash and biometric representation dimension size 503 to demonstrate the security of the EgHash against reconstruction attacks. According to one embodiment, the chart 500 describes biometric matching performance operating under two conditions as the dimension size of the non-biodata key used in generating EgHashes varies. In at least one embodiment, the first operating condition is an embodiment of the present systems and processes, intended verification which involves comparisons of two EgHashes, whereas the second operating condition is under simulated reconstruction attack, which involves comparisons between an original biometric representation and its pre-image (e.g., the data reconstructed from the EgHash via the attack).

In various embodiments, HTER is calculated according to Equation 1. HTER is inversely proportionate to accuracy (e.g., a lower HTER is more desirable). The chart 500 includes a transformed trend 505 and a reconstructed trend 507. In at least one embodiment, the transformed trend 505 represents biometric performance that compares two EgHashes generated as described herein, i.e., under the normal, intended verification operation. According to one embodiment, the reconstructed trend 507 represents biometric performance involving the comparisons between a biometric pre-image—a template reconstructed from EgHashes—and the native template. This scenario simulates a reconstruction attack. As shown, the transformed trend 505 demonstrates consistently accurate biometric matching performance 501 across a range of dimension sizes 503, while the reconstructed trend 507 demonstrates increasingly inaccurate biometric matching performance 501 across the same range. Because the accuracy of matching is preserved in the transformed mode and rapidly diminishes in the reconstructed mode, the chart 500 demonstrates that the EGH transform process generates EgHashes that are substantially secure against reconstruction attacks attempting to retrieve a source biometric representation from an EgHash.

$$HTER=50\%*(\textit{False Acceptance Rate+False Rejection Rate}) \quad \text{(Equation 1)}$$

According to one embodiment, the chart 500 shows that the lossy transformation techniques used herein demonstrate accuracy comparable to conventional solutions, but also provide dramatically enhanced security compared to previous approaches because some of the original biometric information is irreversibly lost. Thus, in various embodiments, the present systems and processes improve upon previous BTP approaches because they do not demonstrate the previous approaches' intolerably high losses in accuracy. For example, in both lossless and lossy transformation techniques, any biometric template that varies in size (for example, a template of fingerprint minutiae) must be translated into a fixed size vector first. Transformation from variable to fixed size is an extremely challenging problem because the process of translation from a variable-dimension template to a fixed-size template invariably results in a significant drop in accuracy, and such drops in accuracy are exacerbated in previous approaches, whereas embodiments of the present systems and processes maintain sufficient biometric performance.

Figure 6:
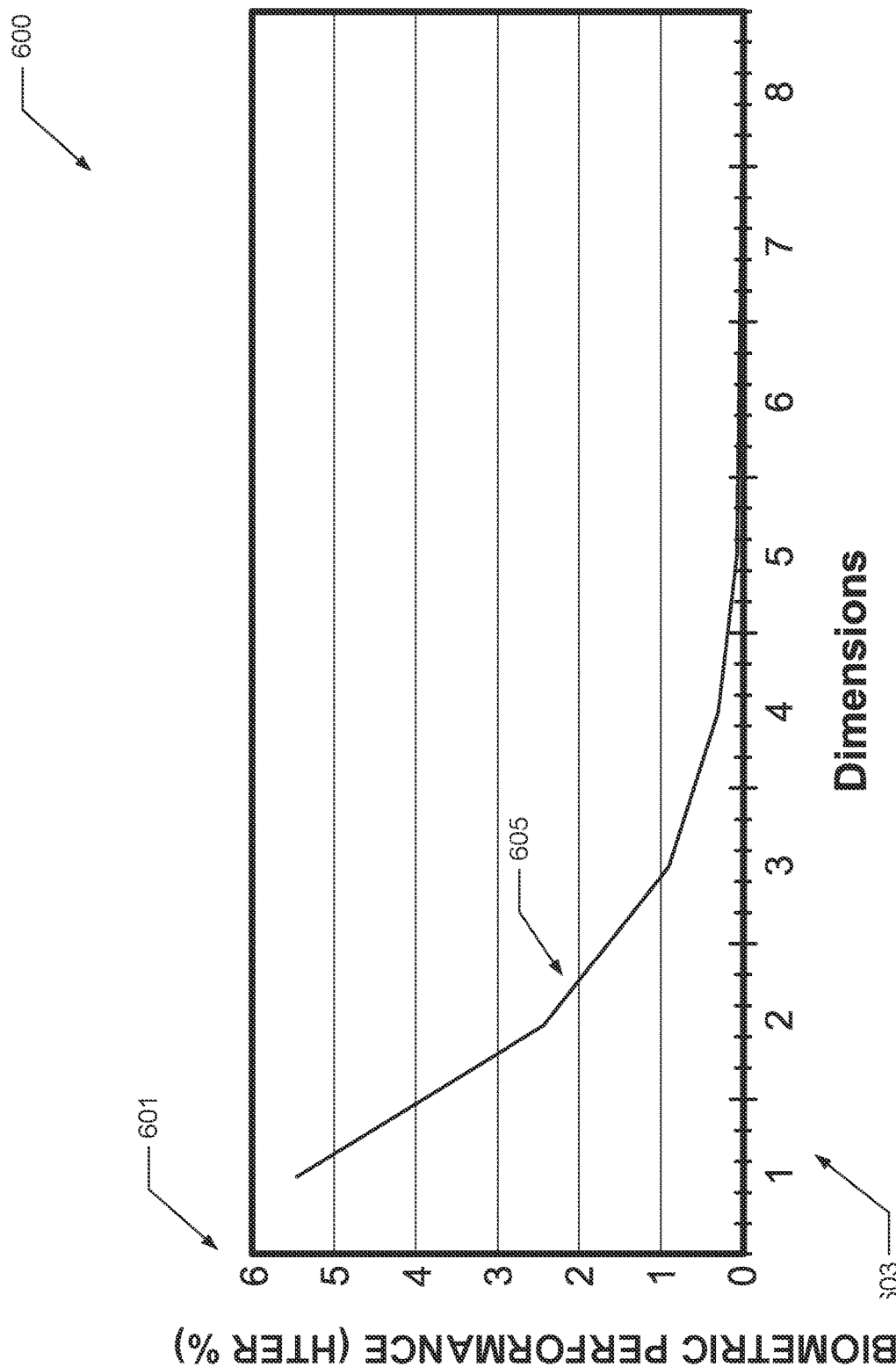
FIG. 6 shows a chart relating biometric matching performance to the size of the non-biodata that is uniquely assigned to each subject (as opposed to using a common non-biodata key) when generating EgHashes, according to one embodiment of the present disclosure.

FIG. 6 shows a chart 600 relating biometric matching performance 601 (expressed as HTER %) to a number of non-biodata dimensions 603 (e.g., dimension of a unique key) used in generating EgHashes. The chart 600 includes a trend 605 demonstrating that, as the number of non-biodata dimensions 601 increases, the biometric matching performance 601 improves (e.g., HTER % decreases). According to one embodiment, the chart 600 demonstrates that blending biodata with non-biodata in the EGH transform may result in EgHashes that are extremely unique and that demonstrate ideal (e.g., 100%) verification performance in biometric matching applications. Therefore, in application where each subject can carry a unique non-biodata representation (or key), perfect verification performance is achievable under the normal operation (e.g., when the key is not compromised) because unique non-biodata increases the uniqueness of EgHash.

Figure 7:
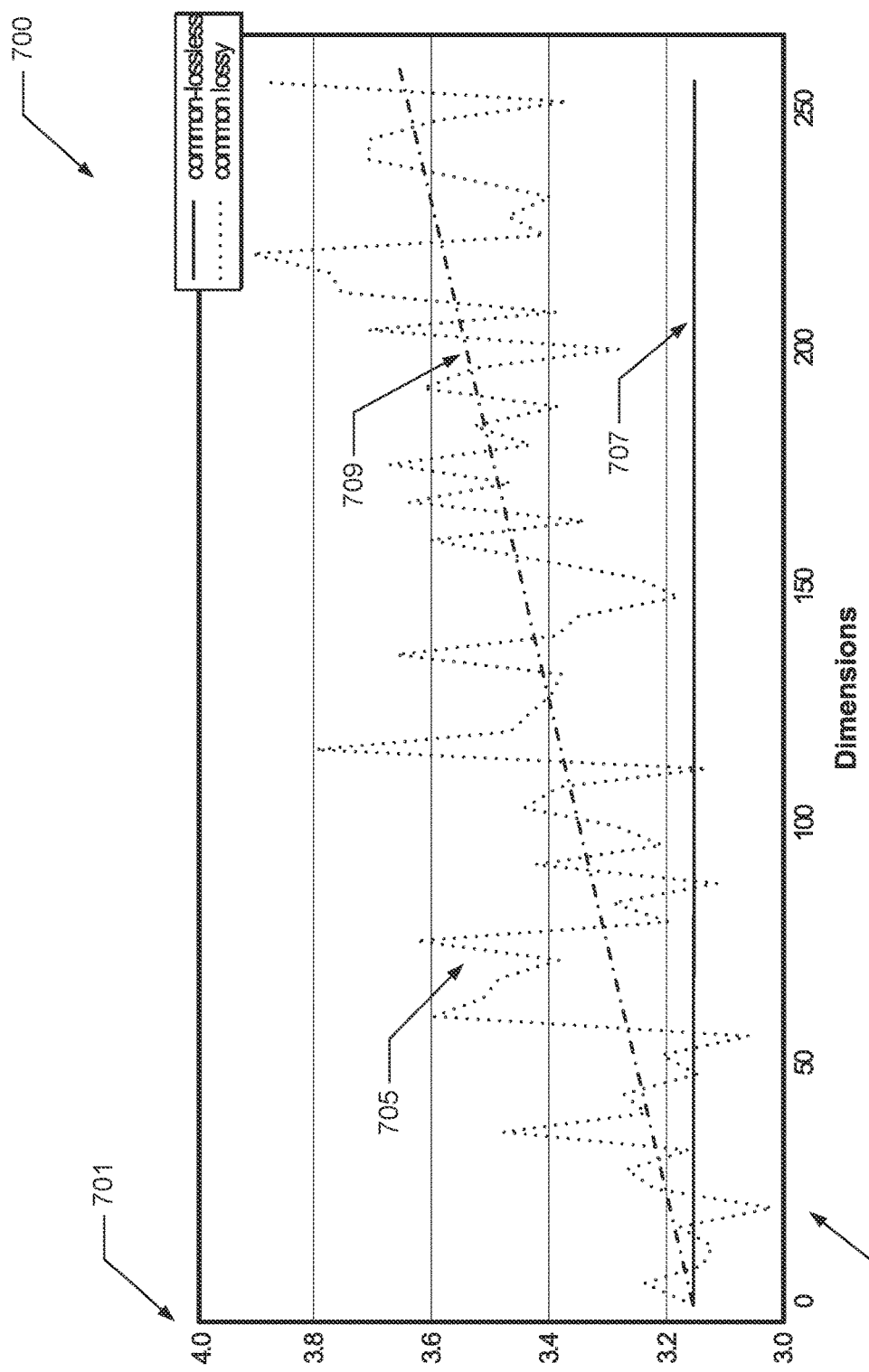
FIG. 7 shows a chart relating biometric matching performance to a number of non-biodata/key dimensions used in generating EgHashes in a small sample size of subjects, comparing lossy versus lossless transform using a common non-biodata key in both cases, according to one embodiment of the present disclosure.

Contrary to using a unique non-biodata key for each subject as done in FIG. 6, FIG. 7 shows a chart 700 relating biometric performance 701 (expressed as HTER %) to a number of non-biodata dimensions 703 using a common non-biodata representation (or key) used in generating EgHashes for a sample size of 1,000 subjects. The chart 700 includes a lossy trend 705 (e.g., associated with lossy EgHashes), a lossless trend 707 (associated with lossless EgHashes), and a gradient 709. In various embodiments, the lossy trend 705 demonstrates that biometric performance 701 with lossy EgHashes decreases as the number of non-biodata dimensions 703 increases. In at least one embodiment, the gradient 709 demonstrates that biometric performance 701 is reduced by approximately 0.00178% per non-biodata dimension 703 increase (e.g., HTER % increases by 0.00178% per non-biodata dimension 703 increase). According to one embodiment, the lossless trend 705 demonstrates that biometric performance 701 is consistent regardless of the number of non-biodata dimensions 703.

Figure 8:
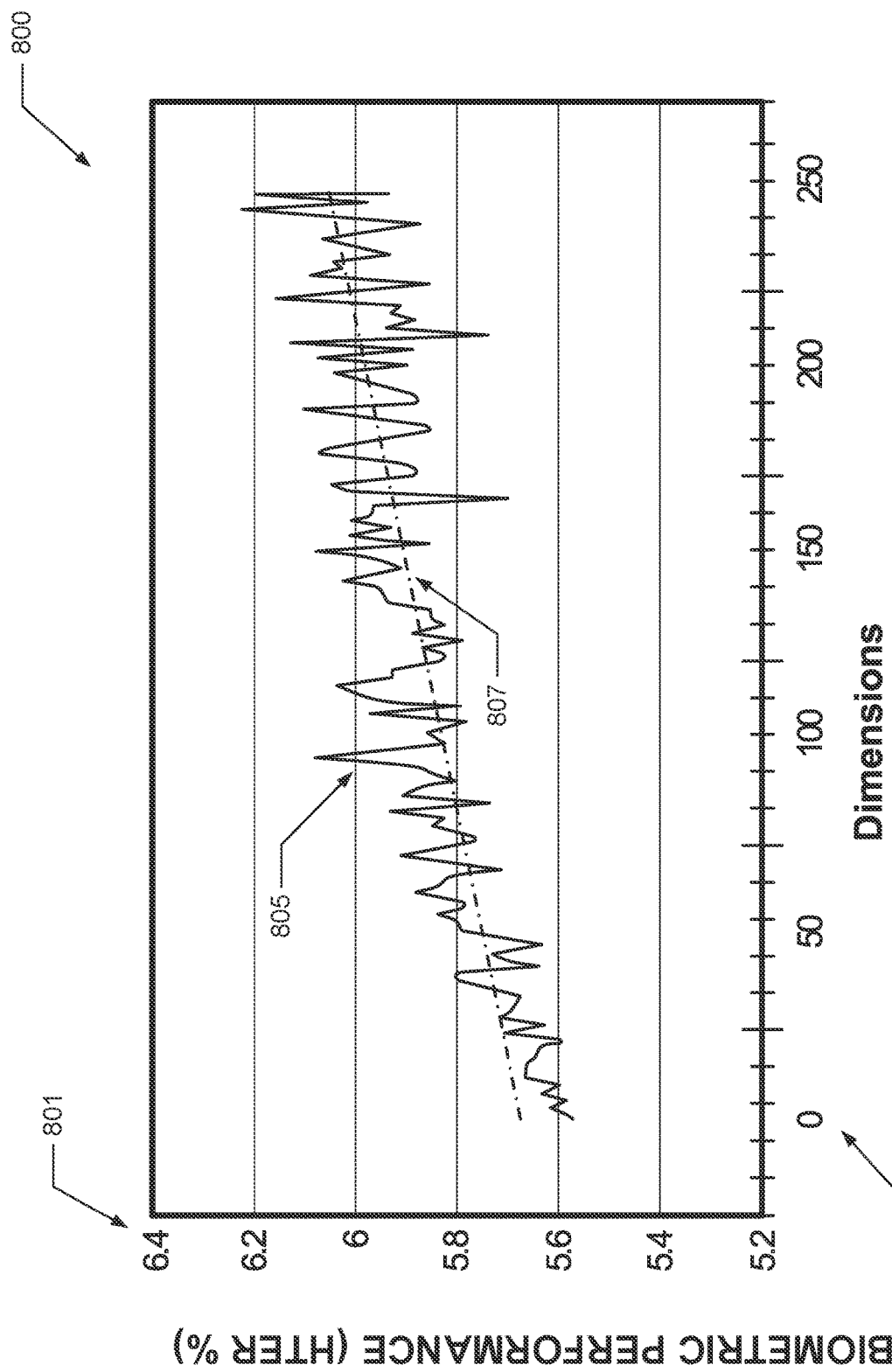
FIG. 8 shows a chart relating biometric matching performance to a number of non-biodata dimensions used in generating EgHashes in a larger sample size of subjects, according to one embodiment of the present disclosure.

FIG. 8 shows a chart 800 relating biometric matching performance 801 (expressed as HTER %) to a number of non-biodata dimensions 803 (e.g., dimension of a unique key) used in generating EgHashes in a sample size of 100,000 subjects. According to one embodiment, the chart 700 shows results associated with a small sample size, whereas the chart 800 shows results associated with a large sample size. The chart 800 includes a lossy trend 805 (e.g., associated with lossy EgHashes) and a gradient 807. In various embodiments, the lossy trend 805 demonstrates that biometric matching performance 801 with lossy EgHashes decreases as the number of non-biodata dimensions 803 increases. In at least one embodiment, the gradient 807 demonstrates that biometric matching performance 801 is reduced by approximately 0.00132% per non-biodata dimension 803 increase (e.g., HTER % increases by 0.00132% per non-biodata dimension 803 increase). In various embodiments, a comparison of 1,000 sample size and −0.00178% performance trend of FIG. 7 and the 100,000 sample size and −0.00132% performance trend of FIG. 8 suggests that biometric matching performance 501 may degrade in varying degrees, albeit, insignificantly, i.e., in the order of 0.001-0.002% per increase in the non-biodata dimension, but the level of security in terms of irreversibility, unlinkability and revocability, is vastly improved.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed systems and processes may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed systems and processes are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems and processes are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the systems and processes are connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems and processes will be readily discernible from the description herein, by those of ordinary skill in the art. Many embodiments and adaptations of the disclosure and claimed systems and processes other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems and processes. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems and processes. In addition, some steps may be carried out simultaneously, contemporaneously, or in synchronization with other steps.

The embodiments were chosen and described in order to explain the principles of the claimed systems and processes and their practical application so as to enable others skilled in the art to utilize the systems and processes and various embodiments and with various modifications as are suited to the particular use contemplated. Alternative embodiments will become apparent to those skilled in the art to which the claimed systems and processes pertain without departing from their spirit and scope. Accordingly, the scope of the claimed systems and processes is defined by the appended claims rather than the foregoing description and the exemplary embodiments described therein.

What is claimed is:

1. A process comprising:
    obtaining a biometric representation of a subject, wherein the biometric representation was encoded from a biometric sample and, prior to encoding, the biometric sample was modified according to at least a rotation parameter;
    concatenating the biometric representation with a key to generate a concatenated biometric representation;
    projecting the concatenated biometric representation based on one or more lossy transformation parameters to generate an anonymized vector representation;
    receiving a second biometric representation associated with the subject;
    generating a second anonymized vector representation based on the second biometric representation;
    performing a 1:1 comparison between the anonymized vector representation and the second anonymized vector representation to generate a similarity score;
    determining that the similarity score satisfies a similarity threshold; and
    in response to determining the similarity score satisfies the similarity threshold, confirming a positive verification of an identity of the subject.

2. The process of claim 1, wherein a vector dimension of the anonymized vector representation is less than a vector dimension of the concatenated biometric representation.

3. The process of claim 1, wherein a vector dimension of the anonymized vector representation is equal to a vector dimension of the concatenated biometric representation.

4. The process of claim 1, further comprising:
generating a random seed; and
prior to projecting the biometric representation, determining the one or more transformation parameters based on the random seed.

5. The process of claim 4, wherein the random seed is generated based on a second key.

6. The process of claim 5, wherein the second key is a unique key received from a user.

7. The process of claim 5, wherein the second key is a common key associated with a particular organization and is received with the biometric representation.

8. A system comprising:
at least one processor; and
a non-transitory, machine-readable memory device comprising instructions stored thereon that, when executed by the at least one processor, cause the at least one processor to:
obtain a biometric representation of a subject, wherein the biometric representation was encoded from a biometric sample and, prior to encoding, the biometric sample was modified according to at least a rotation parameter;
concatenate the biometric representation with a key to generate a concatenated biometric representation;
project the concatenated biometric representation based on one or more lossy transformation parameters to generate an anonymized vector representation;
receive a second biometric representation associated with the subject;
generate a second anonymized vector representation based on the second biometric representation;
perform a 1:1 comparison between the anonymized vector representation and the second anonymized vector representation to generate a similarity score;
determine that the similarity score satisfies a similarity threshold; and
in response to determining the similarity score satisfies the similarity threshold, confirm a positive verification of an identity of the subject.

9. The system of claim 8, wherein a vector dimension of the anonymized vector representation is less than a vector dimension of the concatenated biometric representation.

10. The system of claim 8, wherein a vector dimension of the anonymized vector representation is equal to a vector dimension of the concatenated biometric representation.

11. The system of claim 8, further comprising:
generating a random seed; and
prior to projecting the biometric representation, generating the one or more transformation parameters based on the random seed.

12. The system of claim 11, wherein the random seed is generated based on a second key.

13. The system of claim 12, wherein the second key is a unique key received from a user.

14. The system of claim 12, wherein the second key is a common key associated with a particular organization and is received with the biometric representation.

15. A non-transitory, computer-readable medium comprising instructions that, when executed by a computer, cause the computer to:
obtain a biometric representation of a subject, wherein the biometric representation was encoded from a biometric sample and, prior to encoding, the biometric sample was modified according to at least a rotation parameter;
concatenate the biometric representation with a key to generate a concatenated biometric representation;
project the concatenated biometric representation based on one or more lossy transformation parameters to generate an anonymized vector representation;
receive a second biometric representation associated with the subject;
generate a second anonymized vector representation based on the second biometric representation;
perform a 1:1 comparison between the anonymized vector representation and the second anonymized vector representation to generate a similarity score;
determine that the similarity score satisfies a similarity threshold; and
in response to determining the similarity score satisfies the similarity threshold, confirm a positive verification of an identity of the subject.

16. The non-transitory, computer-readable medium of claim 15, wherein a vector dimension of the anonymized vector representation is less than a vector dimension of the concatenated biometric representation.

17. The non-transitory, computer-readable medium of claim 15, wherein a vector dimension of the anonymized vector representation is equal to a vector dimension of the concatenated biometric representation.

18. The non-transitory, computer-readable medium of claim 15, wherein the instructions, when executed by the computer, cause the computer to:
generate a random seed; and
prior to projecting the biometric representation, generate the one or more transformation parameters based on the random seed.

19. The non-transitory, computer-readable medium of claim 18, wherein the random seed is generated based on a second key.

20. The non-transitory, computer-readable medium of claim 19, wherein the second key is a unique key received from a user.

* * * * *